United States Patent
Perras et al.

(10) Patent No.: US 11,070,973 B2
(45) Date of Patent: Jul. 20, 2021

(54) NETWORK-CONTROLLED WTRU ADDRESS/ANCHOR SELECTION

(71) Applicant: InterDigital Patent Holdings, Inc., Wilmington, DE (US)

(72) Inventors: Michelle Perras, Montreal (CA); Juan Carlos Zuniga, Montreal (CA); Carlos Jesus Bernardos, Madrid (ES); Alexander Reznik, Pennington, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 30 days.

(21) Appl. No.: 14/768,140

(22) PCT Filed: Feb. 18, 2014

(86) PCT No.: PCT/US2014/016966
§ 371 (c)(1),
(2) Date: Aug. 14, 2015

(87) PCT Pub. No.: WO2014/127374
PCT Pub. Date: Aug. 21, 2014

(65) Prior Publication Data
US 2016/0007191 A1    Jan. 7, 2016

Related U.S. Application Data

(60) Provisional application No. 61/765,411, filed on Feb. 15, 2013.

(51) Int. Cl.
*H04W 4/00*    (2018.01)
*H04W 8/26*    (2009.01)
(Continued)

(52) U.S. Cl.
CPC ........... *H04W 8/26* (2013.01); *H04L 61/1511* (2013.01); *H04L 61/1588* (2013.01);
(Continued)

(58) Field of Classification Search
CPC ..... H04W 80/04; H04W 84/12; H04W 88/06; H04W 88/08; H04W 84/18
See application file for complete search history.

(56) References Cited

U.S. PATENT DOCUMENTS 6,473,411 B1 * 10/2002 Kumaki ................. H04L 29/06
                                                       370/331
2004/0018841 A1     1/2004 Trossen
(Continued)

FOREIGN PATENT DOCUMENTS

EP         2237610 A1     10/2010
WO        14/107516        7/2014

OTHER PUBLICATIONS

Ali-Ahmad et al., "Mobility Anchor Selection in DMM: Use-case Scenarios," DMM Working Group, Internet-Draft (Feb. 14, 2013).
(Continued)

*Primary Examiner* — Siren Wei
(74) *Attorney, Agent, or Firm* — Volpe Koenig

(57) ABSTRACT

A method and apparatus are provided to enable or aid network-controlled selection of an IP address (and anchor) to be used by a WTRU on an application/service basis. In one example, a method is provided for a WTRU to establish a link with a gateway, transmit a query related to a selected application via the gateway, receive an advertisement for an internet protocol (IP) address, and use the IP address to communicate via the gateway with respect to the selected application. It may be assumed that there are more than one possible IP address/anchor available for the WTRU to use, as it might be the case in a mobility environment, in which
(Continued)

an operator can provide addresses with different mobility capabilities.

16 Claims, 25 Drawing Sheets

(51) Int. Cl.
  *H04L 29/12* (2006.01)
  *H04W 48/00* (2009.01)
  *H04W 80/04* (2009.01)
  *H04W 76/12* (2018.01)

(52) U.S. Cl.
  CPC ...... *H04L 61/2007* (2013.01); *H04L 61/2015* (2013.01); *H04W 48/17* (2013.01); *H04L 61/2038* (2013.01); *H04W 76/12* (2018.02); *H04W 80/045* (2013.01)

(56) References Cited

U.S. PATENT DOCUMENTS

| | | | |
|---|---|---|---|
| 2007/0060169 A1* | 3/2007 | Johansson | H04L 12/5692 455/453 |
| 2007/0254677 A1 | 11/2007 | Venkitaraman et al. | |
| 2009/0010206 A1 | 1/2009 | Giaretta et al. | |
| 2009/0022124 A1* | 1/2009 | Faccin | H04W 8/02 370/338 |
| 2009/0119412 A1* | 5/2009 | Ala-Vannesluoma | H04W 40/02 709/238 |
| 2010/0091710 A1 | 4/2010 | Jung et al. | |
| 2010/0291943 A1 | 11/2010 | Mihaly et al. | |
| 2011/0013566 A1* | 1/2011 | Aso | H04W 60/00 370/328 |
| 2011/0051689 A1* | 3/2011 | Premec | H04W 8/087 370/331 |
| 2011/0200007 A1 | 8/2011 | Qiang | |
| 2011/0310851 A1 | 12/2011 | Klingenbrunn et al. | |
| 2013/0039249 A1* | 2/2013 | Ravindran | H04W 36/026 370/312 |

OTHER PUBLICATIONS

Bernardos et al., "PMIPv6-based distributed anchoring," DMM Working Group, Internet-Draft (Sep. 21, 2012).
Chan et al., "Requirements for Distributed Mobility Management," Network Working Group, Internet Draft (Dec. 22, 2012).
De La Oliva et al., "The Costs and Benefits of Combining Different IP Mobility Standards," Computer Standards & Interfaces, vol. 35, Issue 2, pp. 205-217 (Feb. 2013).
De La Oliva et al., "The Costs and Benefits of Combining Different IP Mobility Standards," preprint submitted to Computer Standards & Interfaces (Jun. 5, 2012) available at http://www.it.uc3m.es/cjbc/papers/pdf/2013_delaoliva_csi_costs.pdf.
Draves et al., "Default Router Preferences and More-Specific Routes," Network Working Group, Request for Comments: 4191 (Nov. 2005).
Korhonen et al., "IPv6 Prefix Mobility Management Properties," Distributed Mobility Management (DMM), Internet Draft (Oct. 19, 2012).
Luo et al., "Distributed Mobility Management Approaches with IPv6 Prefix Properties," Network Working Group, Internet-Draft (Oct. 15, 2012).
Thaler et al., "Default Address Selection for Internet Protocol Version 6 (IPv6)," Internet Engineering Task Force (IETF), Request for Comments: 6724 (Sep. 2012).
Gundavelli et al., "Proxy Mobile IPv6," Network Working Group, RFC 5213 (Aug. 2008).
Johnson et al., "Mobility Support in IPv6," Network Working Group, RFC 3775 (Jun. 2004).
Perkins et al., "Mobility Support in IPv6," Internet Engineering Task Force (IETF), RFC 6275 (Jul. 2011).
Perkins, "IP Mobility Support," Network Working Group, RFC 2002 (Oct. 1996).

* cited by examiner

NETWORK-CONTROLLED WTRU ADDRESS/ANCHOR SELECTION

CROSS REFERENCE TO RELATED APPLICATIONS

This application claims the benefit of U.S. Provisional Application Ser. No. 61/765,411, filed Feb. 15, 2013, the content of which is hereby incorporated by reference herein.

BACKGROUND

A mobile operator may decide to deploy or configure its network in such a way that several types of internet protocol (IP) addresses are made available for use for attaching wireless transmit/receive units (WTRUs). Each of these types of IP addresses may be associated with different mobility capabilities. A non-exhaustive list of types of IP addresses includes the following: IP mobility enabled, centrally anchored; IP mobility enabled, locally anchored (i.e., handled by a distributed mobility management (DMM) mechanism), only valid for local communications/services; IP mobility enabled, locally anchored (i.e., handled by a DMM mechanism), valid for global communications/services; and, Non-IP mobility enabled, only valid for local communications/services. Non-IP mobility enabled, valid for global communications/services.

Note that the selection of a particular IP address might also imply or require a particular anchor choice. For example, when an IP mobility enabled, locally anchored, address is selected, there may be more than one potential local anchor available.

SUMMARY

A method and apparatus are provided to enable or aid network-controlled selection of the IP address (and anchor) to be used by the WTRU on an application/service basis. In one example, a method is provided for a WTRU to establish a link with a gateway, transmit a query related to a selected application via the gateway, receive an advertisement for an internet protocol (IP) address, and use the IP address to communicate via the gateway with respect to the selected application. It may be assumed that there are more than one possible IP address/anchor available for the WTRU to use, as it might be the case in a mobility environment in which an operator can provide addresses with different mobility capabilities (e.g., no IP mobility enabled only valid for local communications/services, no IP mobility enabled valid for global communications, IP mobility enabled locally anchored, IP mobility enabled centrally anchored, and the like).

BRIEF DESCRIPTION OF THE DRAWINGS

A more detailed understanding may be had from the following description, given by way of example in conjunction with the accompanying drawings wherein.

DETAILED DESCRIPTION

Figure 1A:
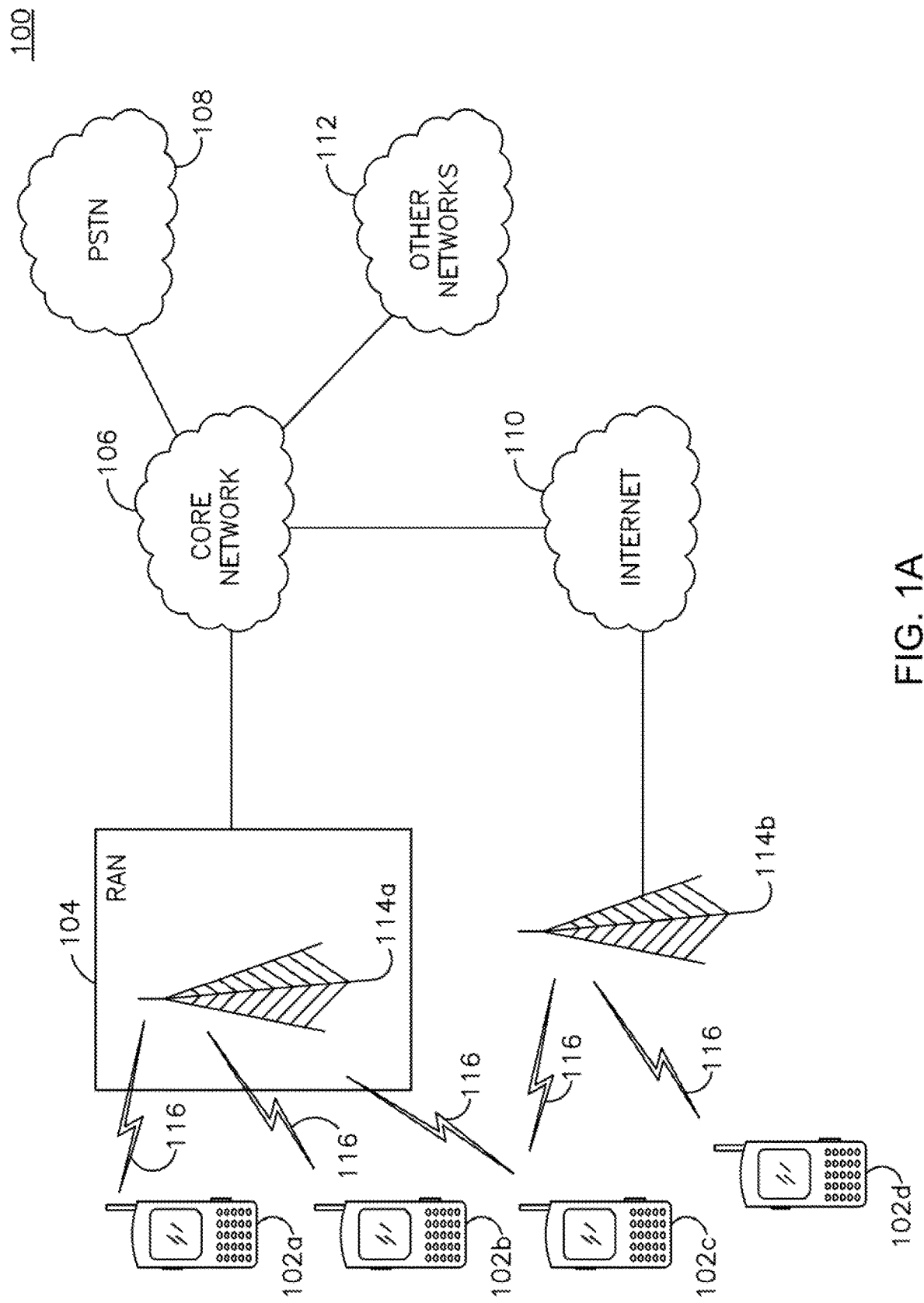
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
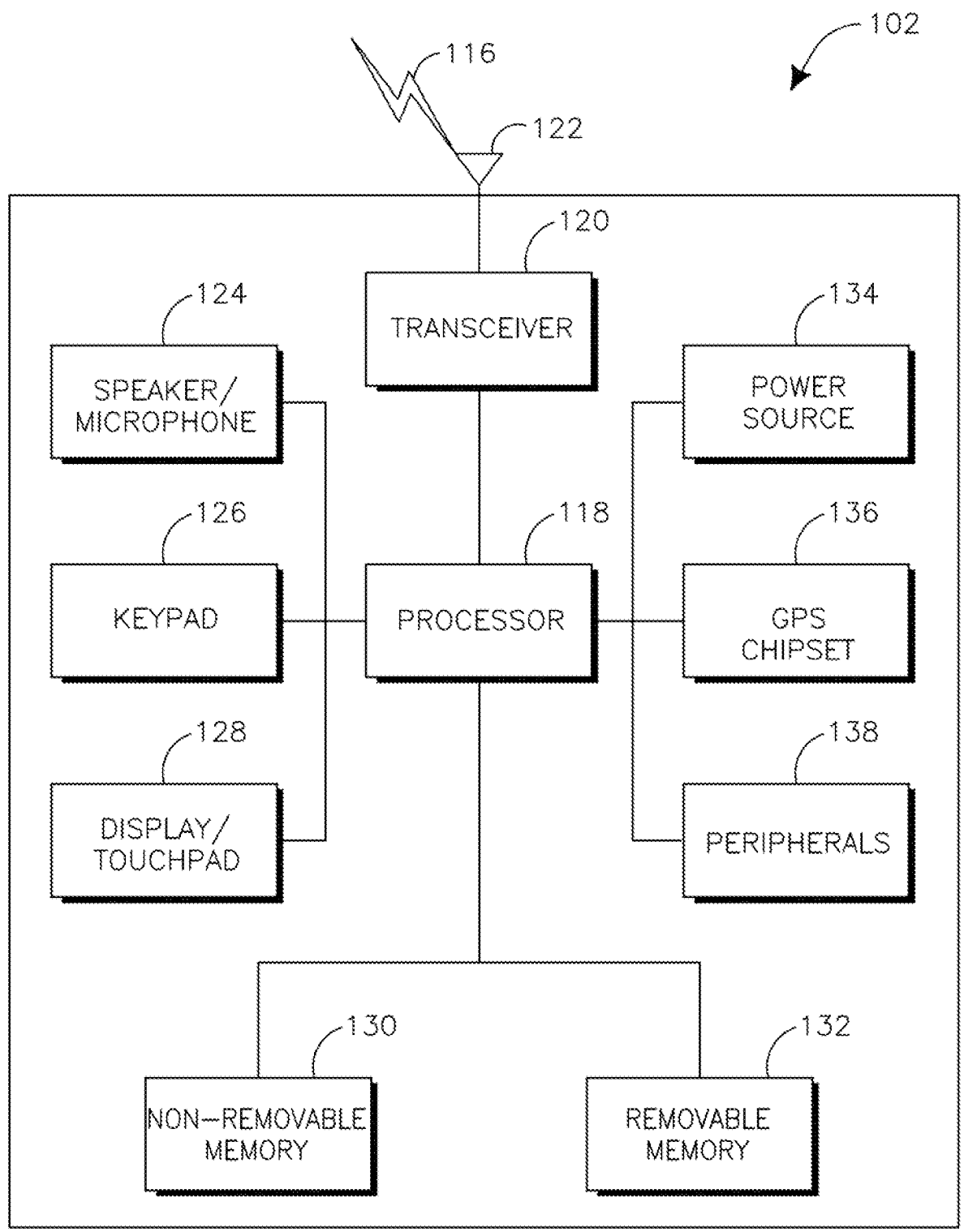
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
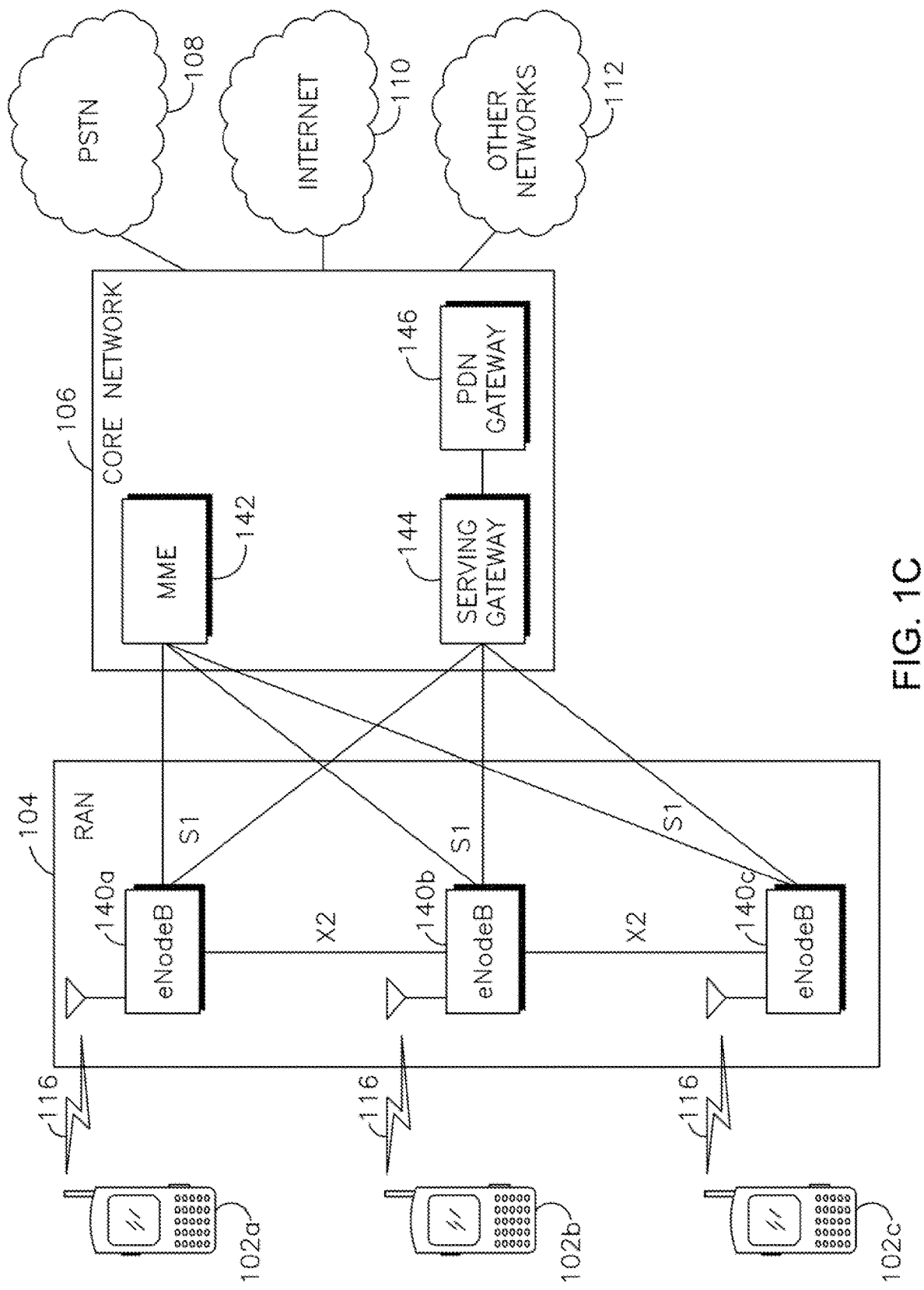
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In contrast to current Mobile IPv6 (MIPv6) and Proxy Mobile IPv6 (PMIPv6) approaches that rely on centralized entities for both control and data plane operation, distributed mobility management (DMM) approaches push mobility anchors towards the edge of the network.

The disclosure relates to mechanisms to enable or aid network-controlled selection of the IP address (and anchor) to be used by a WTRU on an application/service basis. The IP address selection may be from among several types associated with different mobility capabilities. For example, a mobility enabled IP address might be required if the application making use of it is not able to survive an IP address change and the WTRU is expected to change its point of attachment during the lifetime of the session. On the other hand, if an application is able to handle IP address changes or is known to be short-lived in advance, it might be more efficient—resource wise—to make use of an IP address that is not mobility enabled.

The selection mechanisms may include ways for the network (for example, a DMM GW) to detect a new application flow and provide the WTRU with a particular IP address, and may include DNS-triggered IP address/anchor selection, APN-based anchor selection or Network-controlled anchor (local or remote) selection in a dense environment.

The disclosure also relates to mechanisms to enable or aid WTRU-based selection of the IP address (and anchor) with the assistance from the network. These mechanisms may include anchor "coloring," e.g. providing anchoring IP connectivity capabilities to the WTRU to facilitate anchor selection by the WTRU. The capabilities information may include IP connectivity (local, global), anchored address (local, central) and mobility support (yes/no), for example.

Figure 2:
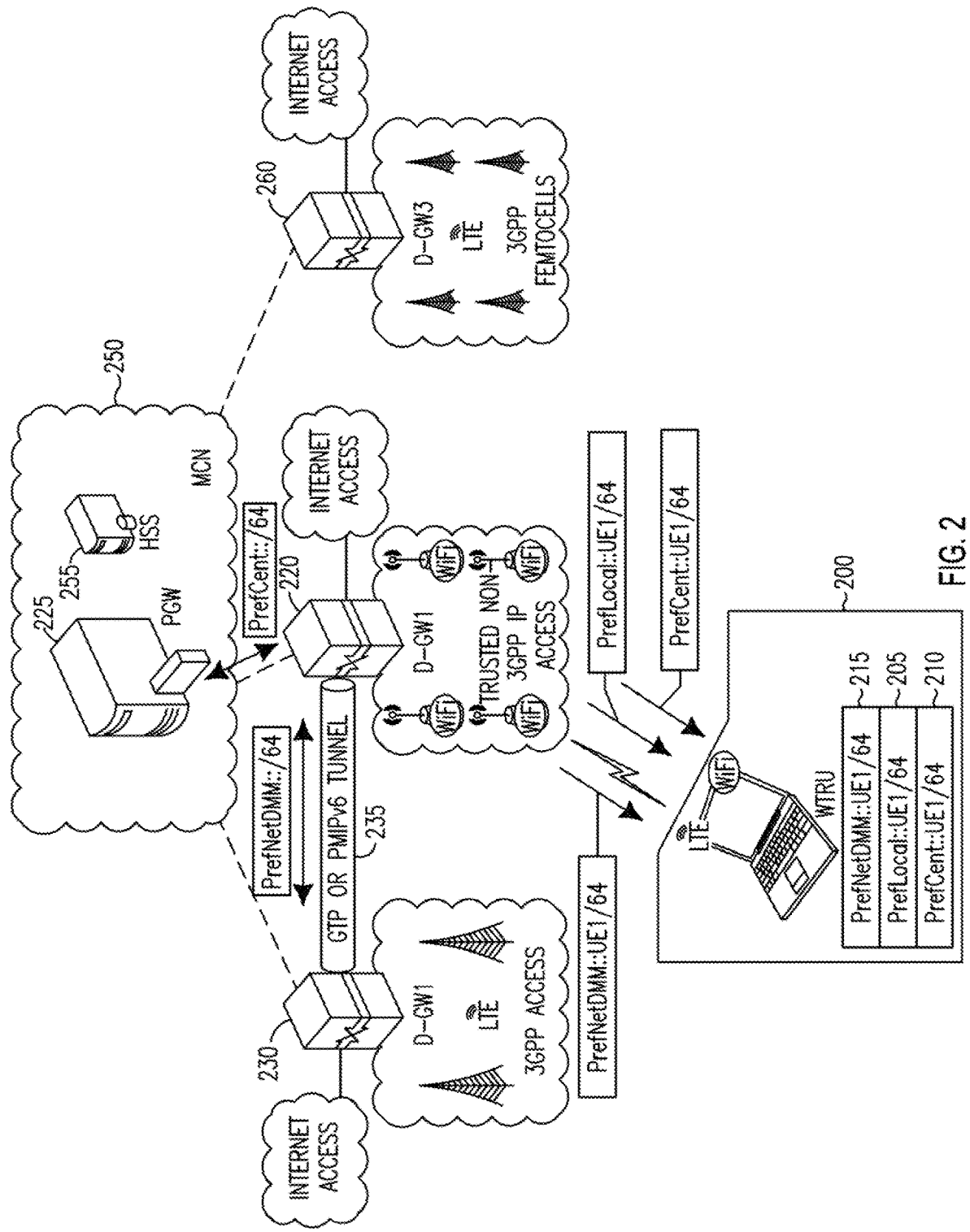
FIG. 2 is a system diagram which illustrates an example of usage of different types of IP addresses.

FIG. 2 is a system diagram illustrating an overview of an example network where a WTRU 200 has configured several types of IP addresses. In this example, WTRU 200 is shown having configured three IP addresses 205, 210, 215. IP address 205 is a locally anchored address which is anchored at its serving gateway, which in this case is distributed gateway D-GW2 220. IP address 210 is a centrally anchored at Packet Data Network Gateway (PGW) 225 via its serving gateway D-GW2 220. IP address 215 is DMM enabled and is anchored at D-GW1 230 via a tunnel 235 which is maintained between D-GW1 230 and D-GW2 220 for this purpose.

The network shown in FIG. 2 also contains a mobile communications network (MCN) 250, home subscriber server (HSS) 255, and an additional gateway D-GW3 260. It is noted however that various topologies are possible which may include different elements.

Figure 3:
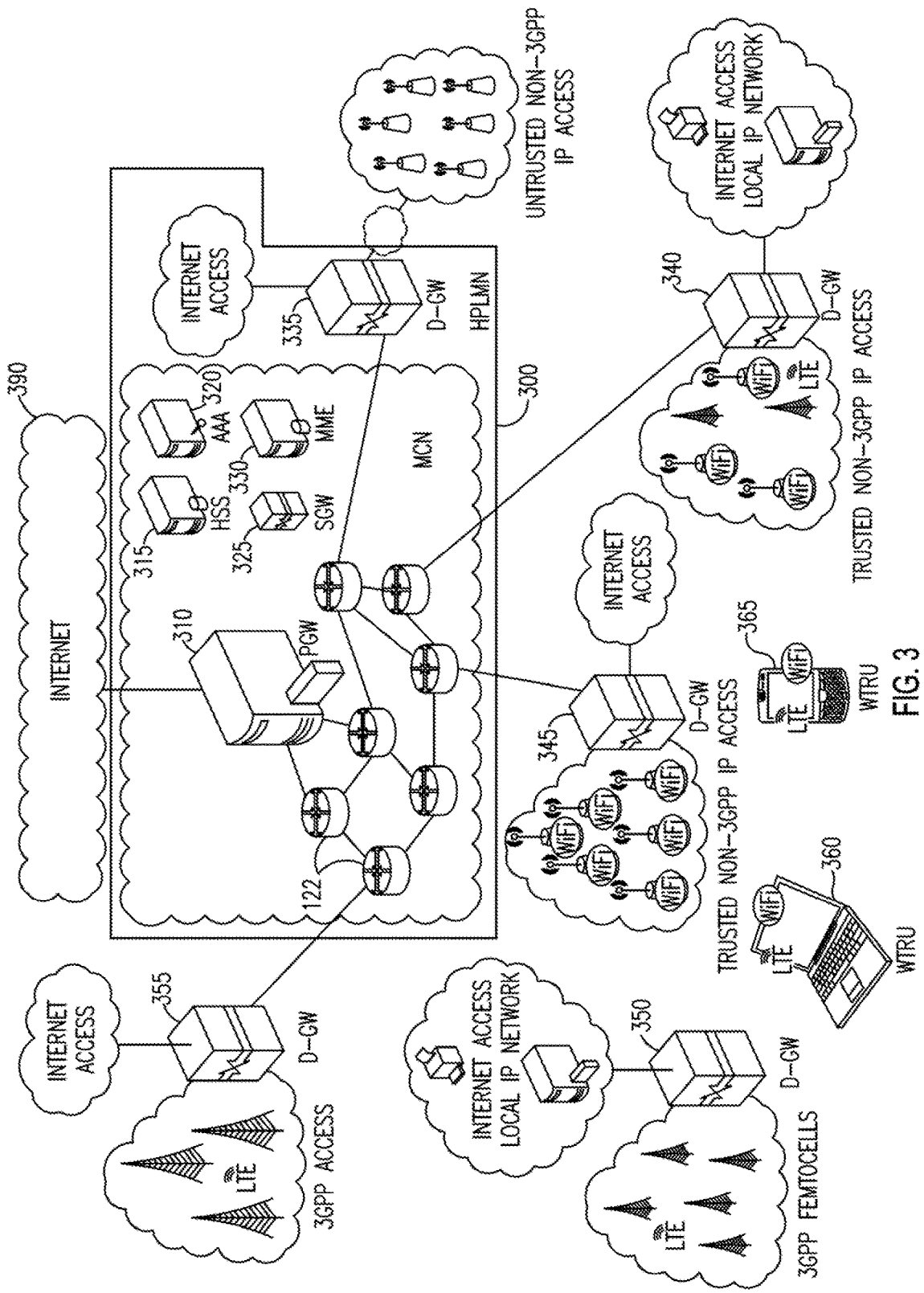
FIG. 3 is a system diagram which illustrates an example of distributed mobility management (DMM) based network architecture.

FIG. 3 is a system diagram illustrating another example network. In this example, a Home Public Land Mobile Network (HPLMN) 300 which is connected to the Internet 390 includes a includes a MCN 305 having a PGW 310, HSS 315, an Authentication, Authorization, and Accounting server (AAA) 320, Serving Gateway (SGW) 325, a Mobility Management Entity (MME) 330, and a D-GW 335.

In this architecture, other D-GW logical entities 340, 345, 350, 355 are placed at the edge of the network, close to WTRUs 360 and 365. Multiple D-GWs exist in a DMM domain, anchoring mobility sessions of the WTRUs attached to the domain. The Distributed Logical Interface (DLIF) artifact enables each (serving) D-GW to expose itself towards each WTRU as multiple routers, one per (active) anchoring D-GW.

Figure 4:
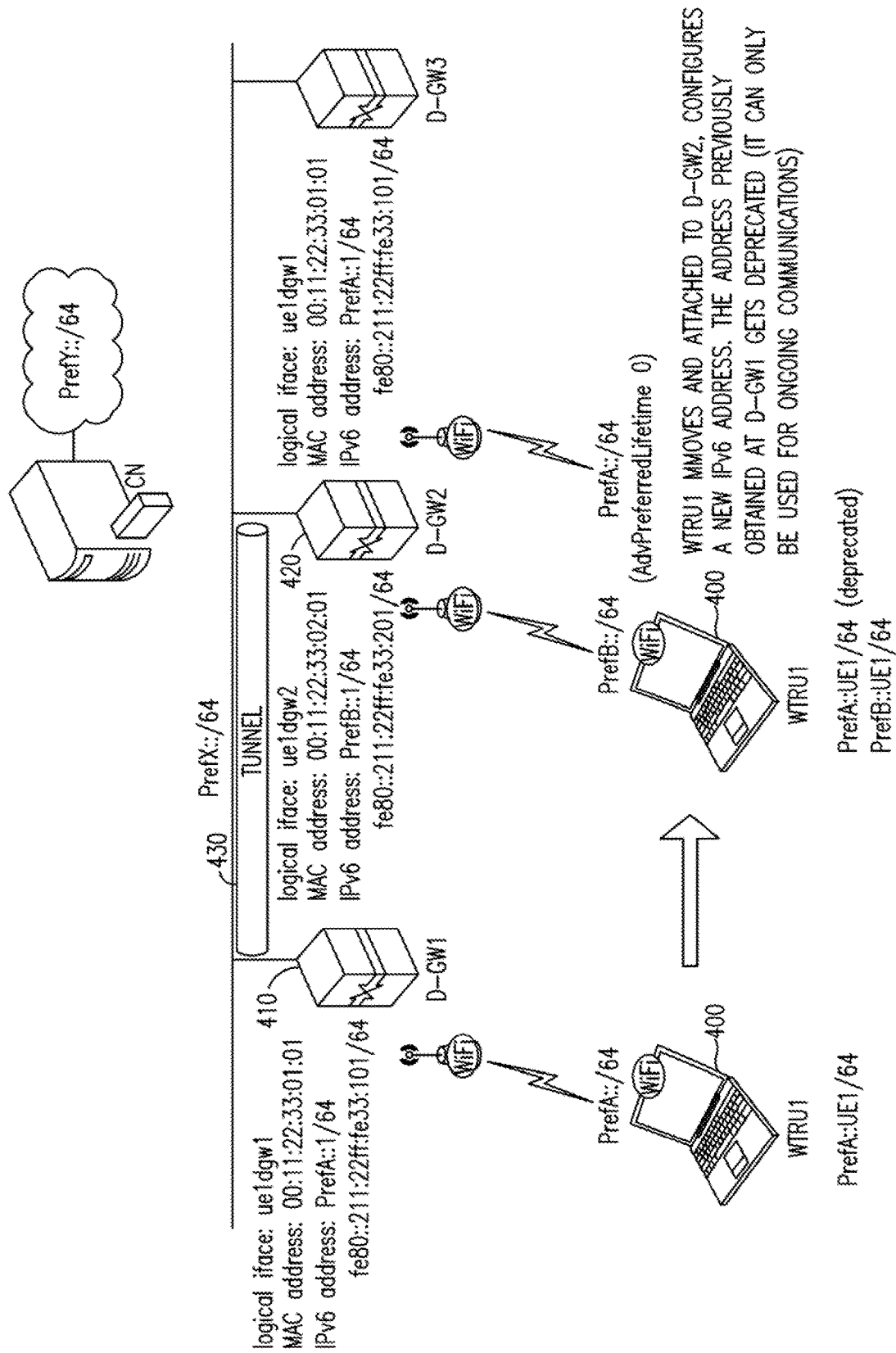
FIG. 4 is a system diagram which illustrates a distributed gateway (D-GW) exposing itself towards a WTRU as multiple routers.

FIG. 4 illustrates a D-GW creating a logical interface with a WTRU for itself as serving D-GW and for each active anchoring D-GW. As shown in FIG. 4, the WTRU 400 initially attaches to D-GW1 410, configuring an IPv6 address (PrefA::UE1) from a prefix locally anchored at D-GW1 410 (PrefA::/64).

At this stage, D-GW1 410 plays the role of both anchoring D-GW and serving D-GW. D-GW1 410 creates a logical interface to communicate (point-to-point link) with the WTRU, exposing itself as a (logical) router with a specific MAC (00:11:22:33:01:01) and IPv6 addresses (PrefA::1/64 and fe80:211:22ff:fe33:101/64) using the logical interface ue1dgw1. As explained below, these addresses represent the "logical" identity of D-GW1 410 towards the WTRU 400, and will "follow" the WTRU 400 while roaming within the domain (note that all this information is maintained up-to-date on the home subscriber server (HSS)).

In this example, WTRU 400 later moves and attaches to a different D-GW of the domain, which is D-GW2 420. D-GW2 creates a new logical interface (ue1dgw2) to expose itself towards WTRU 400, and provides WTRU 400 with a locally anchored prefix (PrefB::/64). Because the HSS has information about other active addresses used by the WTRU 400, and about which D-GWs are anchoring WTRU 400, D-GW2 420 also creates additional logical interface(s) configured to exactly resemble the one(s) used by each of the active anchor D-GW(s) to communicate with the WTRU 420. In this example, D-GW1 410 is the only active anchor D-GW other than D-GW2 420, (which is the serving D-GW), and so in addition to ue1dgw2, only logical interface ue1dgw1 is created.

In order for the prefix anchored at D-GW1 410 to remain reachable by the WTRU 400, a tunnel 430 between D-GW1 410 and D-GW2 420 is established, and the routing is modified accordingly (note that this is done by performing the required signaling, e.g., proxy binding update/proxy binding acknowledge (PBU/PBA) for the case of the Proxy Mobile IPv6 (PMIPv6)-based solution). From a practical viewpoint, this may require source-based routing.

Figure 5:
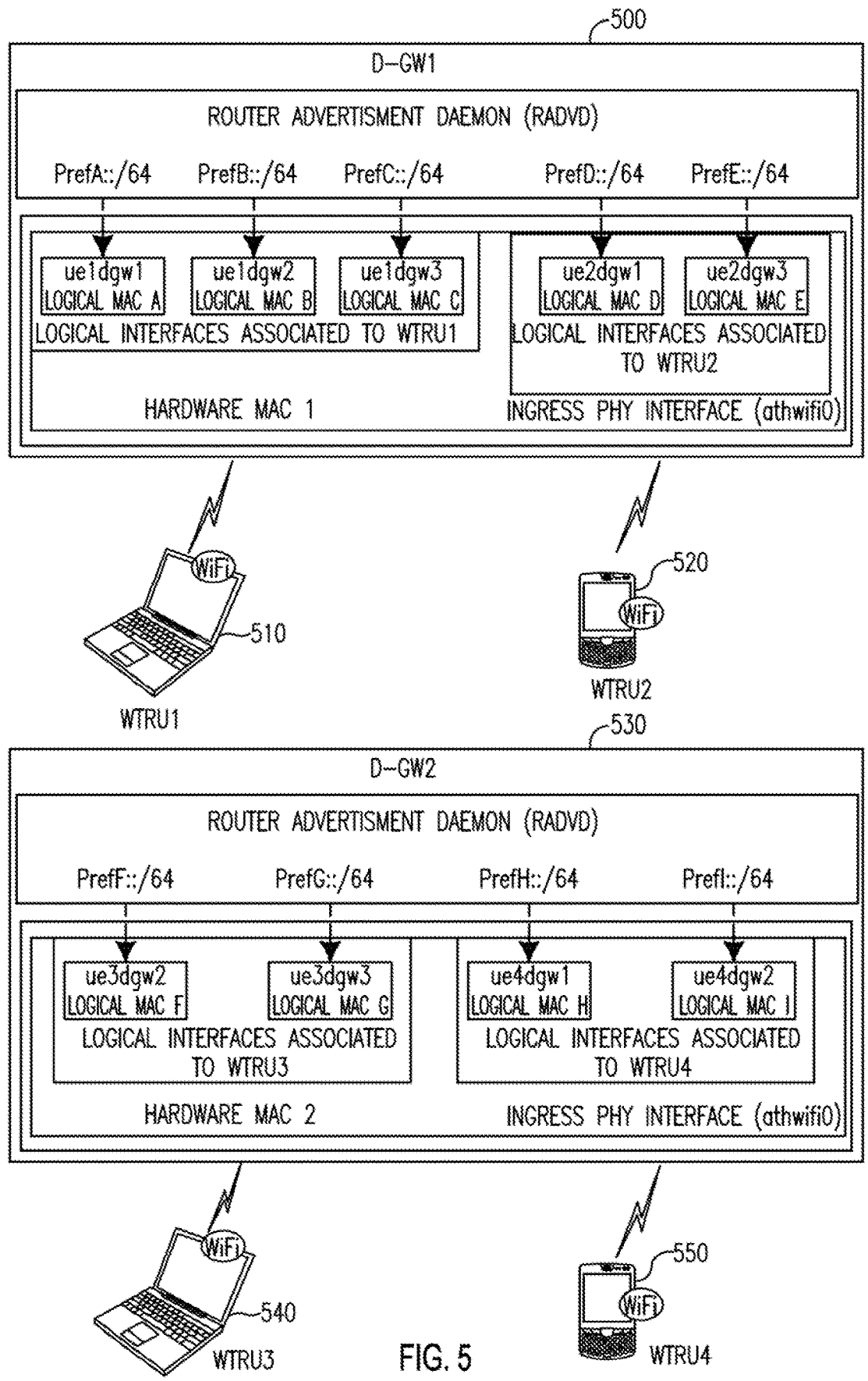
FIG. 5 is a system diagram which illustrates an example D-GW logical interface concept.

FIG. 5 illustrates the logical interface concept in more detail. The figure shows two D-GWs and four WTRUs. Here, D-GW1 500 is currently serving WTRU1 510 and WTRU2 520, while D-GW2 530 is serving WTRU3 540 and WTRU4 550. WTRU1 510 has three active anchoring D-GWs: D-GW1 500, D-GW2 530 and D-GW3 (not shown). WTRU2 520 has two active anchoring D-GWs: D-GW1 500 and D-GW3 (not shown). WTRU3 540 has two active anchoring D-GWs: D-GW2 530 and D-GW3 (not shown). Finally, WTRU4 550 has also two anchoring D-GWs: D-GW1 500 and D-GW2 530.

A serving D-GW typically plays the role of anchoring D-GW for an attached (served) WTRU, and each D-GW has one single physical wireless interface (athwifi0). Each WTRU "sees" multiple logical routers—one per active anchoring D-GW—independent of to which serving D-GW the WTRU is currently attached. From the perspective of the WTRU, each anchoring D-GW (including the serving D-GW, which also functions as an anchoring D-GW) is portrayed as a different router even though the WTRU is physically attached to a single physical interface. The serving D-GW facilitates this by configuring different logical interfaces.

In the example of FIG. 5, WTRU1 510 is currently attached to D-GW1 500. In other words, D-GW1 500 is the serving D-GW for WTRU1 510. Accordingly, WTRU1 510 has configured an IPv6 address from D-GW1's pool (in this case PrefA::/64), and D-GW1 500 has created a logical interface (ue1dgw1) on top of its wireless physical interface (athwifi0) which is used to serve WTRU1 510. This interface has a logical MAC address (MAC A), different from the hardware MAC address of the physical interface athwifi0 of D-GW1 (MAC 1). D-GW1 advertises its locally anchored prefix PrefA::/64 over the ue1dgw1 interface.

In the example of FIG. 5, WTRU1 510 visited and attached to D-GW2 530 and D-GW3 (not shown) prior to attaching to D-GW1 500. Accordingly, WTRU1 510 configured locally anchored addresses at D-GW2 530 and D-GW3 (not shown), which are still being used by WTRU1 in active communications. Although WTRU1 510 is no longer directly wirelessly connected to D-GW2 530 and D-GW3 (not shown), WTRU1 still "sees" interfaces connecting to D-GW2 530 and D-GW3 (not shown), as if it were directly wirelessly connected to all three D-GWs. This is facilitated by D-GW1, which configures logical interfaces ue1dgw2 and ue1dgw3 in its role as serving D-GW.

From the perspective of WTRU1 510, logical interfaces ue1dgw2 and ue1dgw3 behave in the same way as the logical interfaces configured by the D-GW2 530 and D-GW3 (not shown) when WTRU1 was attached to them directly. This means that both the MAC and IPv6 addresses configured on these logical interfaces remain the same regardless of the physical D-GW which is serving the WTRU. The information required by a serving D-GW to properly configure these logical interfaces can be obtained from the HSS or by any other means.

From an implementation point of view, several operating systems (OSs) already support the creation of different logical interfaces over the same physical interface. Each logical interface appears as a regular interface to the OS, and the OS supports configuring the MAC address exposed by the logical interface. It is actually the destination MAC address that is used by the OS to decide which logical interface processes an incoming L2 frame.

In order to enforce use of the locally anchored prefix at the serving D-GW, router advertisements sent over the logical interfaces corresponding to the non-serving anchor D-GWs may include a zero prefix lifetime parameter. The goal is to deprecate prefixes delegated by anchor D-GWs which are no longer serving the WTRU. Because of the zero prefix lifetime, on-going communications may continue to use addresses delegated by non-serving anchor D-GWs, but new communications cannot begin using those addresses.

Several examples are presented herein where a WTRU attached to a mobile network may benefit from network-controlled IP address/anchor selection support. In these examples, it is assumed that the WTRU does not have the intelligence to be able to select and use the right IP address/anchor solely on its own (this would require an enhanced connection manager, and also of some mechanisms on the network side to convey the information about available addresses/anchors—and their associated capabilities—to the WTRU). An exception is the anchor "coloring" solution presented herein, which presents a solution for the network to convey information useful to the WTRU to aid it in requesting the right type of IP address to the router it is attached to.

Figure 6:
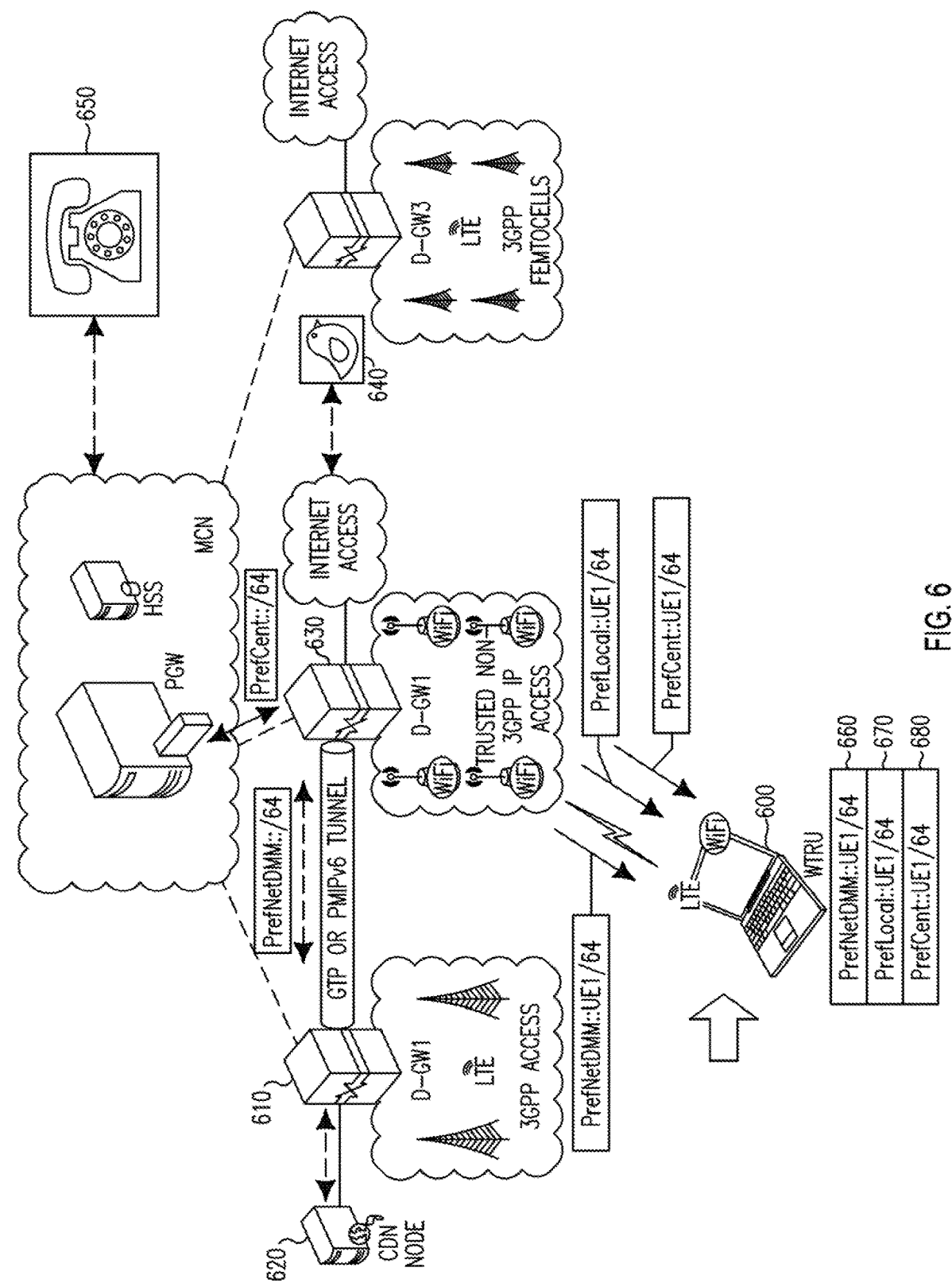
FIG. 6 is a system diagram which illustrates an example application-tailored IP address selection scenario.

FIG. 6 illustrates an example of application-tailored IP address selection. In the example, a WTRU 600 is roaming within one operator's domain. Here, the WTRU 600 does not have the capability and/or information to be able to select the most appropriate IP address, on a per-flow and/or per-application basis. Because the WTRU 600 does not have the intelligence required to select and use an appropriate IP address, several problems may arise in the absence of another approach.

One potential problem is that WTRU 600 may become connected via an IP mobility enabled address for communications that do not require these capabilities. Examples of such communications include very short dialogues, such as domain name system (DNS) query and response, applications that can themselves cope with IP address changes more efficiently, and so forth. The use of an IP mobility enabled IP address for such communications may cause unnecessary signaling overhead and additional traffic in the mobile operator's core with no added benefit.

Another potential problem is that WTRU 600 may become connected using a non-IP mobility enabled address for communications that require IP address continuity. Voice over Internet Protocol (VoIP)) communications, for example, can require IP address continuity. The use of a non-IP mobility enabled IP address for such communications may lead to communication disruptions if the WTRU changes its point of attachment.

A further potential problem is that WTRU 600 may end up attempting to use an address that is meant for local communications to reach a peer on the public Internet.

Still another potential problem is that WTRU 600 may keep using a single IP address (anchored on a node different from its current point of attachment) even though there might be other IP addresses available for the WTRU to use that would lead to more optimal paths.

In the example of FIG. 6, it is assumed that the WTRU 600 was initially attached to D-GW1 610 (this attachment is not shown in FIG. 6) and requested to play a certain video which is available via a content distribution network (CDN). Here, the requested video is available at a CDN cache node 620 which is locally connected to D-GW1 610. Based on the nature of the communication (i.e. video) and the fact that it is likely that the WTRU 600 may move (i.e. no longer be directly wirelessly connected to D-GW1 610) during the duration of the video, the network may decide to provide the WTRU 600 with an IP mobility enabled, locally anchored address 660 (PrefNetDMM::/64), to be used by the video application. It is noted that throughout the specification reference may be made to decisions made or other actions taken by the network, and it is understood that this may mean that the decision or action is made by the serving node (e.g. D-GW2 630 in this case) or another network device in communication with the WTRU, serving node, or anchoring node as appropriate.

WTRU 600 later moves and attaches to D-GW2 630 (as shown in FIG. 6). The continuity of the video session is maintained by the distributed mobility management (DMM) mechanism deployed in the network.

While attached to D-GW2 630, the user may decide to post some content to a social network 640 (e.g., Twitter™). Since this traffic is short-lived and can easily cope with an IP address change (e.g. because each posting is a different TCP session), the network may decide to provide the WTRU 600 with a non IP mobility enabled address 670 (PrefLocal::/64) to be used by the social network application.

Lastly in this example, the user may begin a phone call with a fixed phone 650 attached to the PSTN. Because this call must be routed via the mobile operator's core network, and because it is likely that the user will move during the lifetime of the call, the network may decide to assign the user a mobility-enabled, centrally anchored IP address 680 (PrefCent::/64) for this traffic.

Selecting IP addresses by analyzing application requirements on the network side in this way may allow "legacy" WTRUs to benefit from rational IP address choices (also helping improve the overall network efficiency); and may allow taking network formation/status into consideration in the decision.

A WTRU mobility pattern-tailored anchor selection is also possible. In a dense environment, a WTRU may likely change its point of attachment frequently. If the WTRU is using an IP mobility enabled, locally anchored address (i.e., using a DMM solution), each point of attachment may be a potential anchor for an IP address. However it might be advantageous not to assign an IP address on each attachment, but to carefully select which nodes play the role of anchors. Note that if the WTRU configures a different IP address on each attachment point (which then plays the role of anchor for the assigned address), the WTRU may easily end up having many IP addresses configured. Further, in order to maintain the accessibility of those IP mobility enabled addresses, the network has to keep an updated tunnel between the anchor of each IP address and the node to which the WTRU is currently attached. This not only may add network state, but also may introduce signaling and handover delays. From the perspective of the node to which the WTRU is currently attached, network state may refer to the IP addresses of the anchors of each IP address, as well as the IP prefix or prefixes to be anchored. From the perspective of the anchors, network state may refer to an IP address of the node to which the WTRU is attached, as well as the IP prefix or prefixes anchored, for example. Further, in this kind of dense environment, even if the WTRU is not moving quickly, it might be changing its point of attachment quite often. It may therefore be desirable to avoid configuring a new IP address on each attachment, which may easily lead to a significant number of anchors being simultaneously used by the WTRU. Note that in a non-dense environment, even for a fast-moving WTRU the number of handovers may be lower. Therefore, it may be more efficient to pre-select which nodes anchor an IP address. This can be seen as introducing a kind of hierarchical structure in the network, as out of all the potentially visited nodes, only a few of them will play the role of anchors. This may save bandwidth utilization in the network, and may reduce the complexity and issues arising from frequently changing or adding IP addresses on the terminal.

The anchor selection may take into consideration different kinds of information, such as an expected mobility pattern of the WTRU (based on previous historic recorded patterns or other information that the network might have on current WTRU movement), as well as the connectivity requirements of an application running on the WTRU (i.e., not all the anchors may have the same load or provide connectivity with the same quality to peer(s) with which the WTRU is communicating).

Figure 7A:
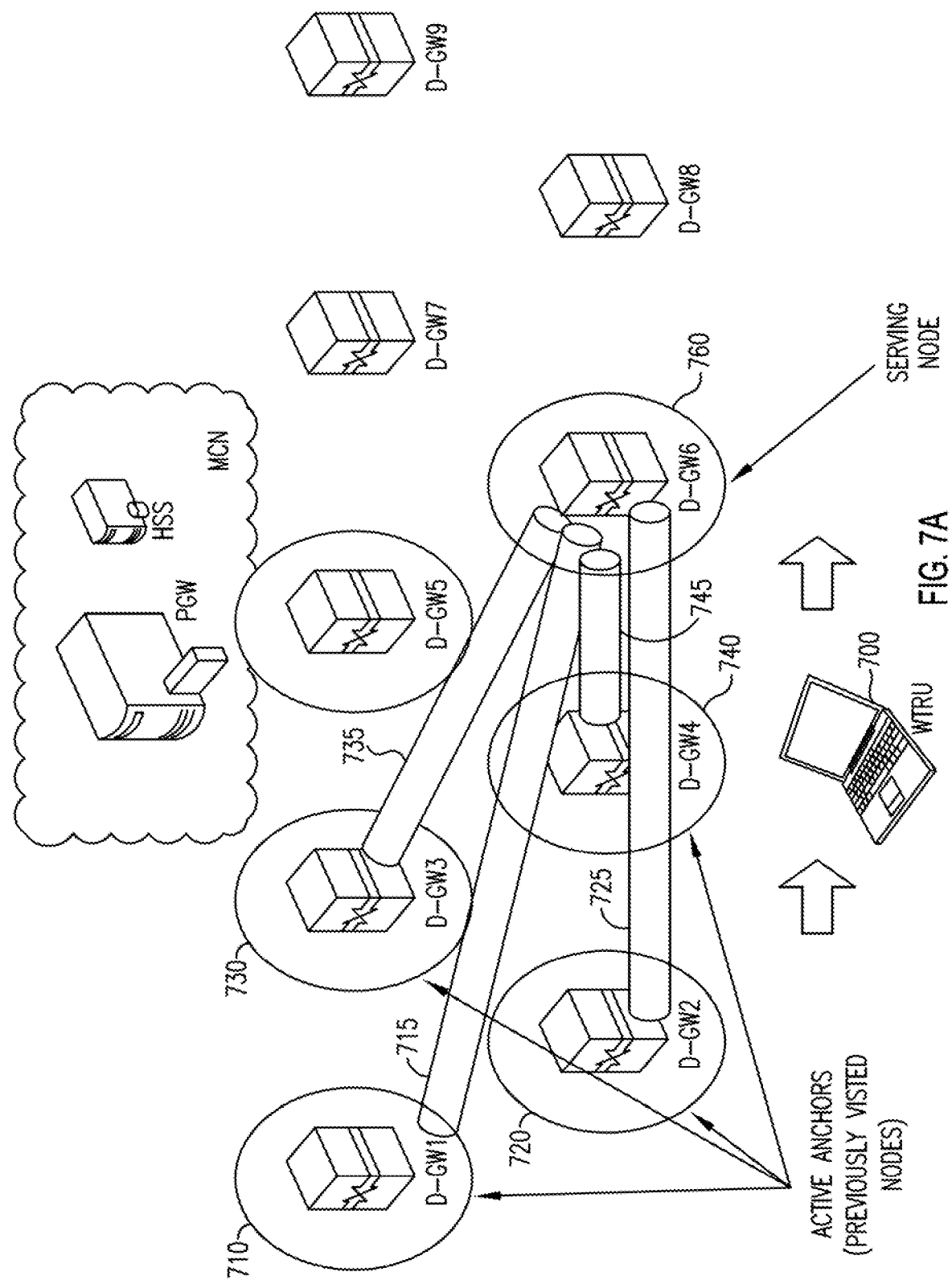
FIG. 7 is a system diagram which illustrates an example scenario in which a WTRU is roaming within a dense DMM environment.
Figure 7B:
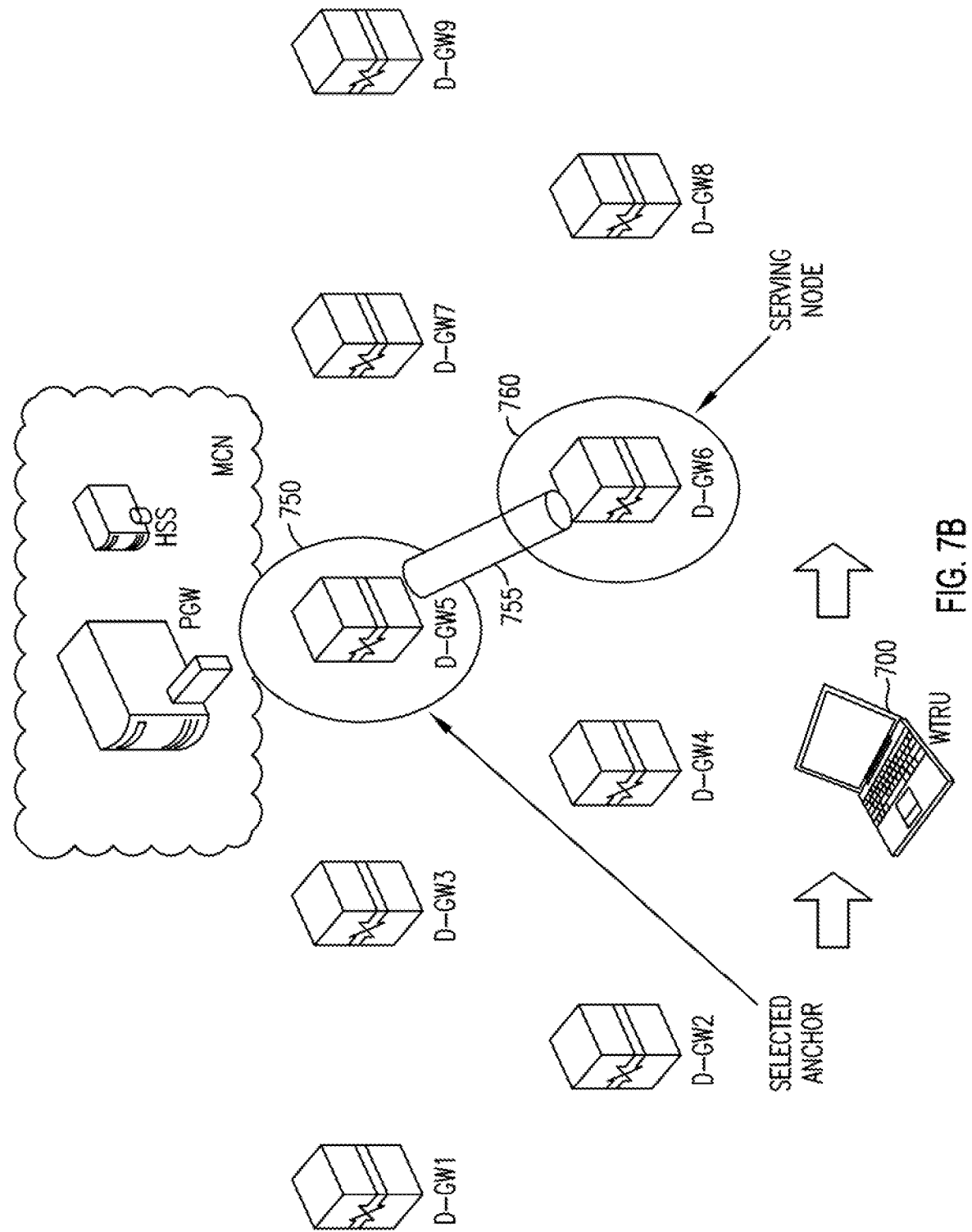

FIGS. 7*a* and 7*b* each illustrate an example of a scenario in which a WTRU 700 is roaming within a dense DMM environment.

FIG. 7*a* illustrates an example where each previously visited attachment point becomes an anchor. In this example, the anchor nodes for WTRU 700 are nodes 710 (D-GW1), 720 (D-GW2), 730 (D-GW3), and 740 (D-GW4), which were each previously attached to WTRU 700. As shown, WTRU 700 is currently attached to a serving node, which in this case is node 760 (D-GW6). Serving node 760 maintains a tunnel connection 715, 725, 735, 745, with each of the anchor nodes 710, 720, 730, 740 respectively so that WTRU 700 may reach the anchored prefixes from serving node 760.

As can be seen in FIG. 7*a*, WTRU 700 will become attached to still further serving nodes if it continues to move through the dense DMM environment shown, and that it will be necessary for each of these serving nodes to establish tunnel connections with all of the previous serving nodes in order for WTRU 700 to reach anchored prefixes from each new serving node. The complexity and overhead associated with establishing and maintaining these tunnel connections and anchored prefixes will mount accordingly, and in a dense DMM environment such as shown in FIG. 7*a*, it may not be efficient for each serving node to become an anchor for IP addresses assigned to WTRU 700.

FIG. 7*b* illustrates an example where only one of the nodes in the group of D-GWs plays the role of anchor. In this example, node 750 (D-GW5) is selected as the anchor node for WTRU 700 when it is attached to any of the group of nodes shown, and as a consequence only one tunnel 755 will be required for each successive serving node. It should be noted that node 750 remains the sole anchor for the group of nodes even if WTRU 700 attaches to node 750 as a serving node, in which case no tunnel would be required.

A DNS-triggered solution for the network to detect a new application flow and provide the WTRU with a particular IP address, as well as an address-deprecation based approach and a specific-route based approach are also possible.

Figure 8:
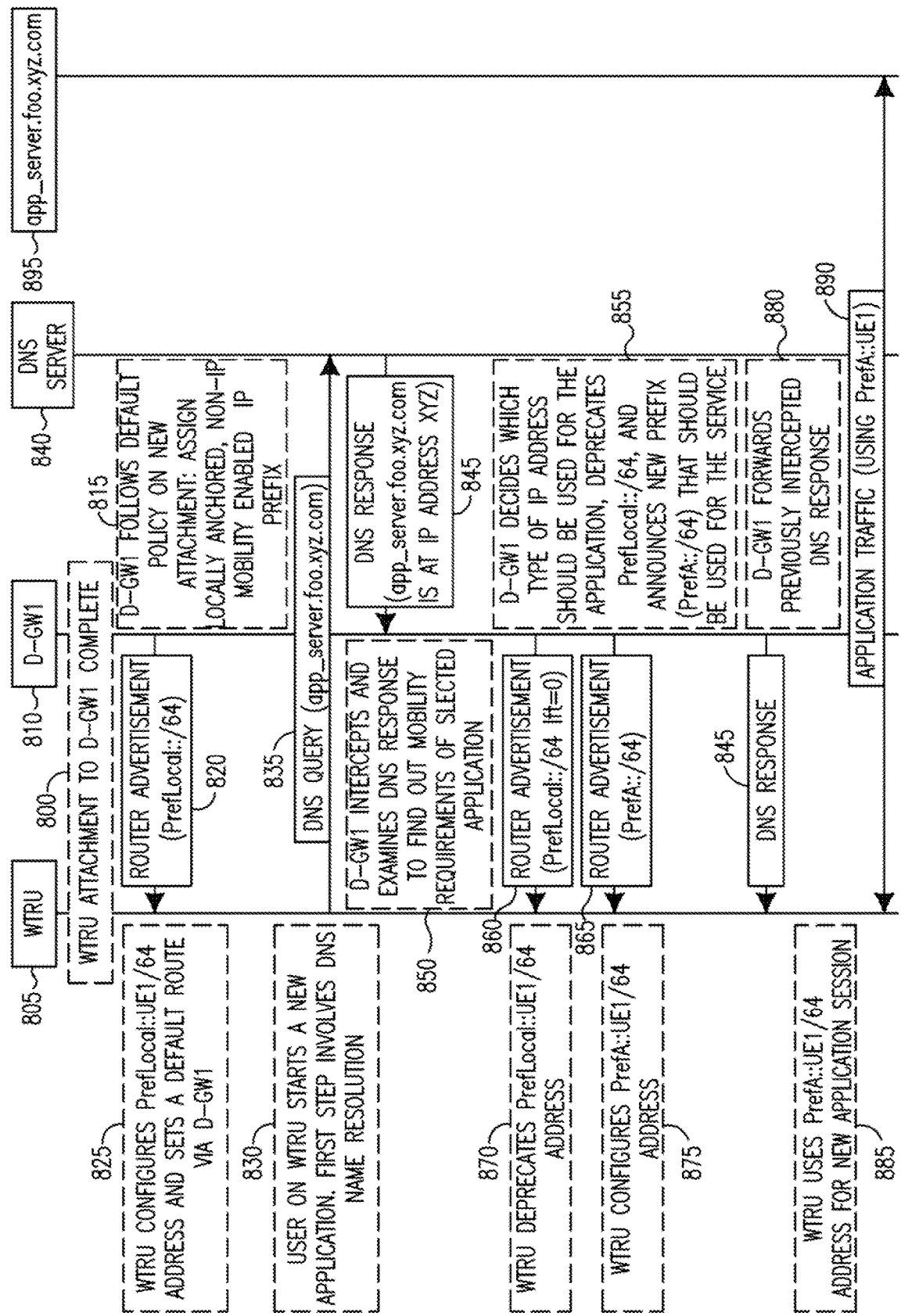
FIG. 8 is a message sequence chart which illustrates an example of address-deprecation based domain name system (DNS)-triggered IP address/anchor selection.

FIG. 8 is a message sequence chart illustrating example signaling for address-deprecation based DNS-triggered IP address and anchor selection.

In step 800, WTRU 805 attaches to a network via an access router (which is a distributed gateway designated as D-GW1 810 in this example, although other types of access router may be used in various implementations). In step 815, D-GW1 810 initially assigns an IP address to WTRU 805 following a default policy (which might be specific per user or generic). In this example, the default policy is to assign a locally anchored, non-IP mobility enabled prefix (PrefLocal::/64), and this prefix is advertised to WTRU 805 in message 820.

In step 825, WTRU 805 may configure an IP address (PrefLocal::UE1/64)) using the prefix received in message 820. WTRU 805 may set a default route via D-GW1 810.

In step 830, a user of WTRU 805 starts a new application, which triggers a session dialogue using the configured prefix. In this case, the first packet sent is a DNS query 835 which is sent to DNS server 840 via D-GW1 810. In this example, the DNS query solicits the IP address of a server 895 where app_server.foo.xyz.com is hosted. It is noted that it is typical for application dialogues to begin by resolving DNS names.

The response 845 to query 835 is intercepted 850 by D-GW1 810 which may analyze either or both of the name and the resolved IP address or addresses against a database to attempt to identify the type of application that the user is starting, and the associated mobility capability requirements. It is noted that the access router may be co-located with a local DNS resolver (i.e., D-GW1 810 may be co-located with DNS server 840) but in either case a DNS response will necessarily traverse the access router, where it may be intercepted. It is noted that in some implementations the DNS query itself may be intercepted and analyzed rather than the DNS query response.

This application-type and mobility-capability information, possibly together with other available information about the WTRU 805 (e.g., mobility pattern, speed, and the like), may be used in a step 855 to select an appropriate type of IP address/anchor that should be used for this session. D-GW1 810 may also, in step 855, then deprecate the local address previously configured, including sending a message 860 to WTRU 805 (which may deprecate the local address in a step 870), and advertise the new local address (e.g. IP mobility enabled locally anchored address, mobility-enabled centrally anchored IP address, and the like), including sending a message 865 to WTRU 805 (which may configure the new local address in a step 875). In a step 880, D-GW1 810 may also forward the DNS response 845, so that in a step 885 the WTRU 805 may then start the application session, using the appropriate IP address/anchor selected by the network for transmitting and receiving application traffic 890 to and from application server 895.

Figure 9A:
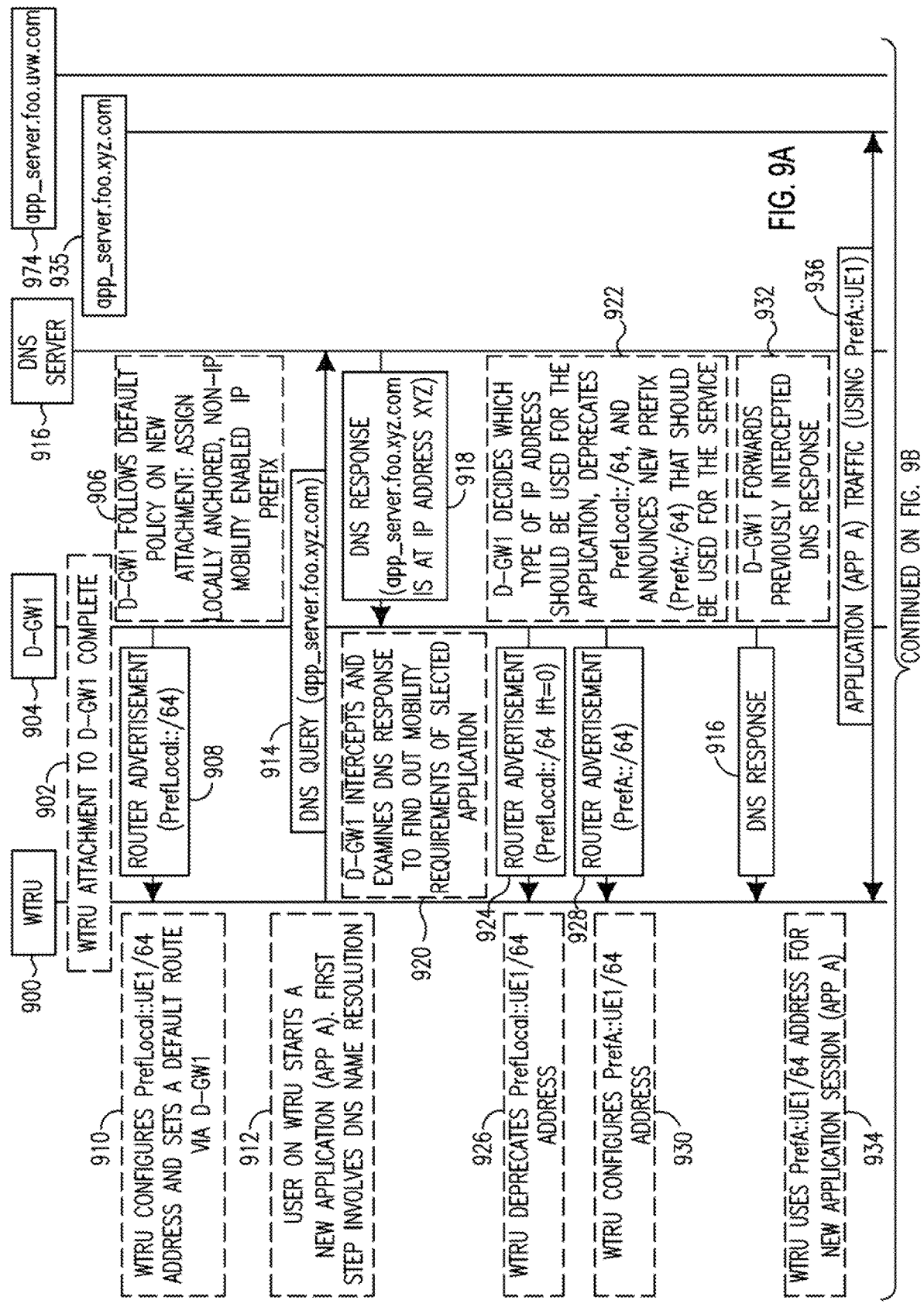
FIG. 9 is message sequence chart which illustrates an example of address-deprecation based DNS-triggered IP address/anchor selection with multiple applications.
Figure 9B:
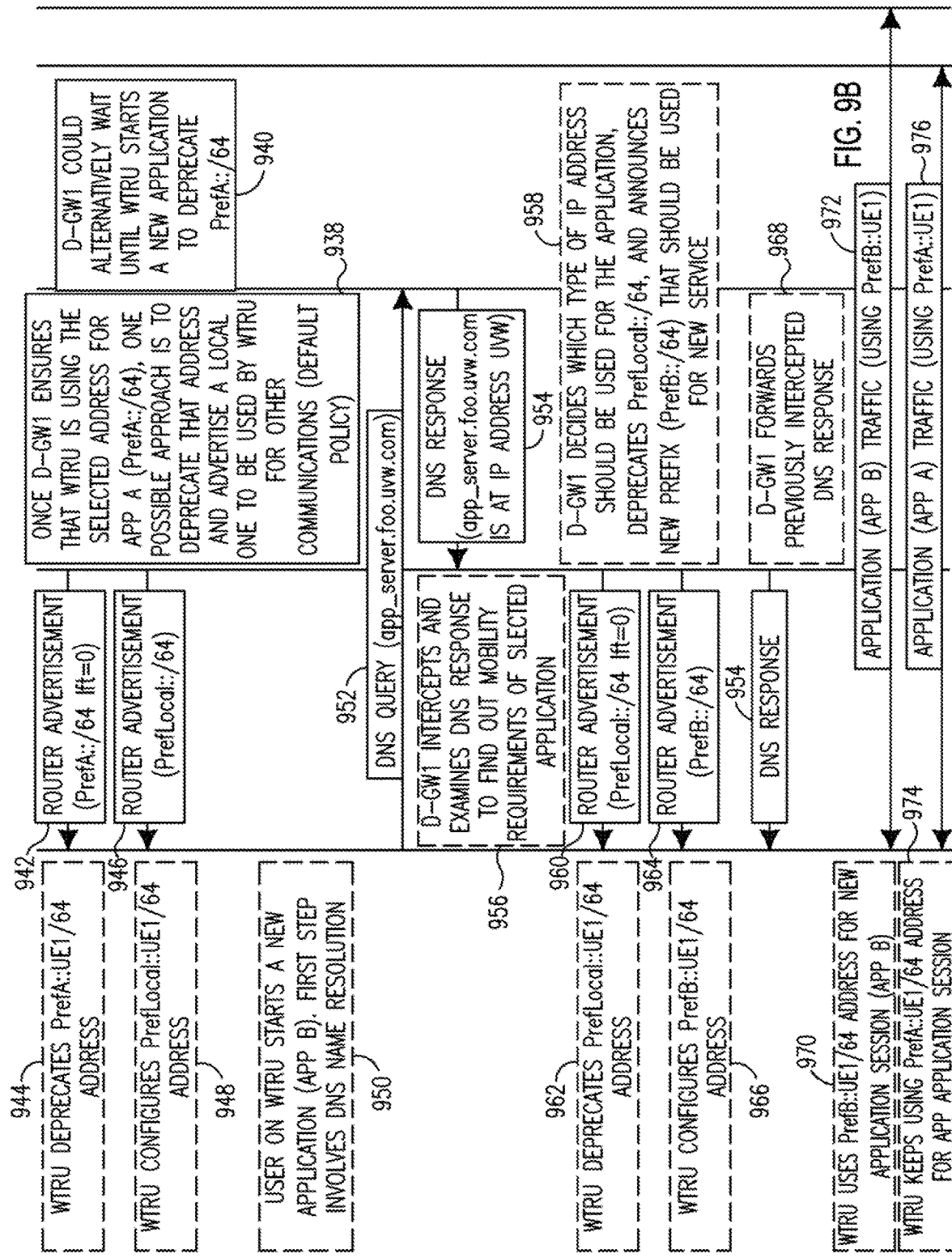

FIG. 9 is another message sequence chart illustrating example signaling for address-deprecation based DNS-triggered IP address and anchor selection. The message sequence chart of FIG. 9 is similar to FIG. 8 and further illustrates how the network may decide upon, advertise, and configure appropriate IP addresses for a WTRU 900 that is running multiple applications/services simultaneously.

In step 902, WTRU 900 attaches to a network via an access router (which is a distributed gateway designated as D-GW1 904 in this example, although other types of access router may be used in various implementations). In step 906, D-GW1 904 initially assigns an IP address to WTRU 900 following a default policy (which might be specific per user or generic). In this example, the default policy is to assign a locally anchored, non-IP mobility enabled prefix (PrefLocal::/64), and this prefix is advertised to WTRU 900 in message 908. In step 910, WTRU 900 may configure an IP address (PrefLocal::UE1/64)) using the prefix received in message 908.

In step 912, a user of WTRU 900 starts a new application, which triggers a session dialogue using the configured prefix. In this example, the first packet sent may be a DNS query 914 which is sent to DNS server 916. In this example, the DNS query solicits the IP address of a server 935 where app_server.foo.xyz.com is hosted. The response 918 to this query may be intercepted 920 by D-GW1 904, which may analyze either or both of the name and the resolved IP address or addresses against a database to attempt to identify the type of application that the user is starting, and the associated mobility capability requirements. It is noted that the access router may be co-located with a local DNS resolver (i.e., D-GW1 904 may be co-located with DNS server 916, for example) but in either case a DNS response will necessarily traverse the access router, where it may be intercepted. It is noted that in some implementations the DNS query itself may be intercepted and analyzed rather than the DNS query response.

This application-type and mobility-capability information, possibly together with other available information about the WTRU 900 (e.g., mobility pattern, speed, and the like) may be used in a step 922 to select an appropriate type of IP address/anchor that should be used for this session. D-GW1 904 may also in step 922 then deprecate the local address previously configured, including sending a message 924 to WTRU 900 (which may deprecate the local address in a step 926), and advertise the new local address (PrefA::/64), including sending a message 928 to WTRU 900 (which may configure the address in a step 930). In a step 932, D-GW1 904 may also forward the DNS response 917, so that in a step 934, the WTRU 900 may then start the application session (APP A), using an appropriate IP address/anchor selected by the network for transmitting application traffic 936 to and from application server 935.

Once the WTRU 900 has started the application flow, D-GW1 904 may in a step 938 deprecate the previously assigned address and announce again the locally anchored prefix, which is advertised as a default following the default policy discussed above. Alternatively, D-GW1 904 may in step 940 wait for the WTRU 900 to start a new application and then deprecate the previously assigned address and announce again the locally anchored prefix specified by the default policy discussed above. In either case 938, 940, the D-GW1 904 may at the appropriate time transmit a deprecation message 942 to WTRU 900 (which may deprecate the local address in a step 944) and transmit an advertisement message 946 to WTRU 900 (which may configure the new local address in a step 948). It is noted that even if PrefA::/64 is deprecated, the WTRU 900 may continue using it for traffic 976 during the lifetime of the application APP A session 974.

If in a step 950 the WTRU 900 starts a new application (APP B), the same process may be repeated. In this case, D-GW1 904 may in a step 956 intercept a response 954 to DNS query 952 (for app_server.foo.uvw.com) which is sent to DNS server 916. In a step 958, D-GW1 904 may then analyze the response 954 from DNS server 916, and select an appropriate type of IP address to be used by the WTRU 900 for APP B.

D-GW1 904 may then advertise a prefix of this type (in this example, PrefB::/64) including sending a message 964 to WTRU 900 (which may configure a new IP address configured from that prefix at step 966). D-GW1 904 may also deprecate the local address that was previously configured, and send an appropriate message 960 to WTRU (which may deprecate the local address in a step 962).

In a step 968 the D-GW1 904 may forward DNS response 954 to WTRU 900. In a step 970, WTRU 900 may begin using the newly configured IP address for APP B communication flow 972. Once the WTRU 900 has started using the newly configured address, D-GW1 904 may deprecate PrefB::/64 and announce the locally anchored prefix.

Figure 10A:
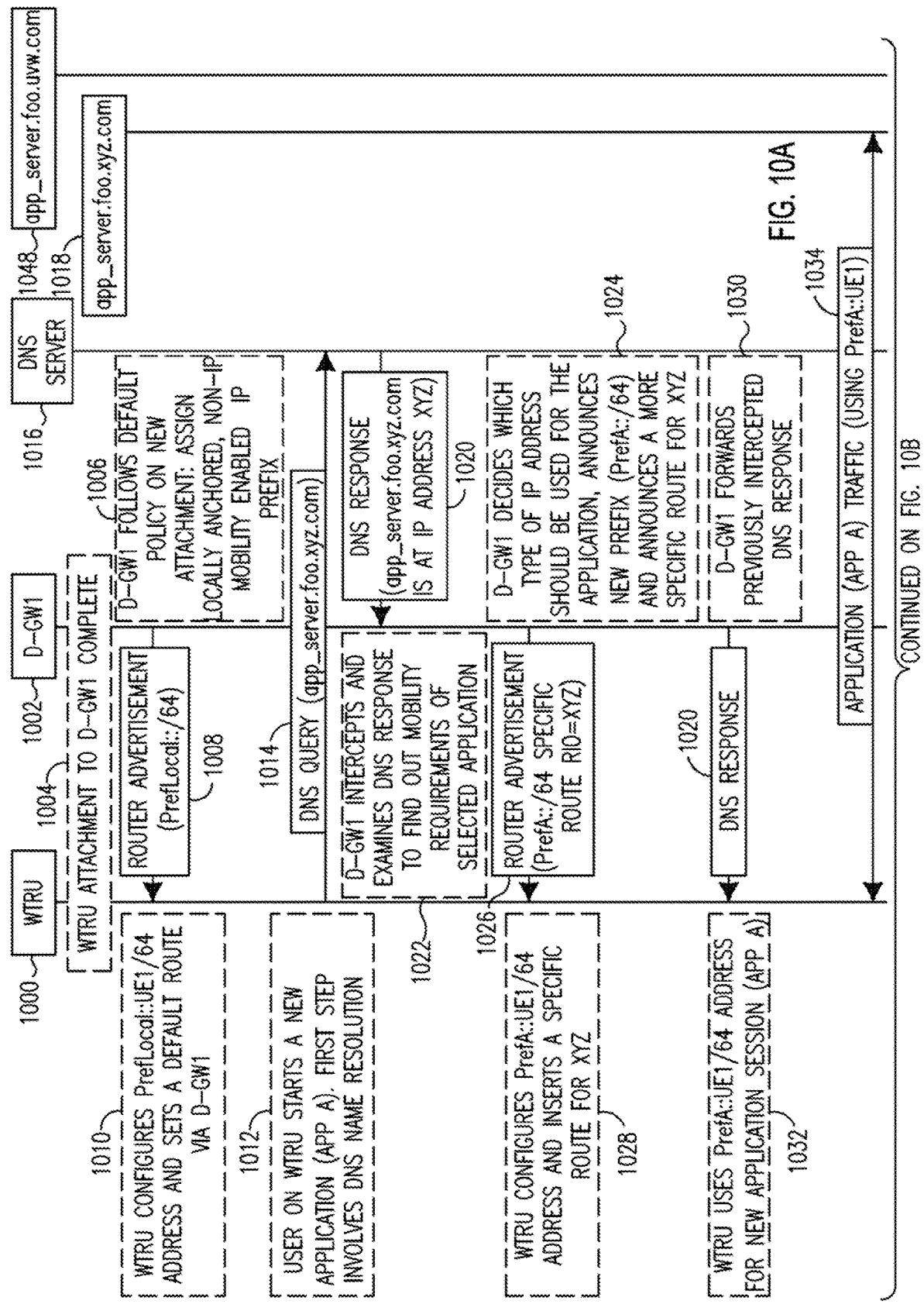
FIG. 10 is a message sequence chart which illustrates an example of address-deprecation based DNS-triggered IP address/anchor selection with a more specific route and with multiple applications.
Figure 10B:
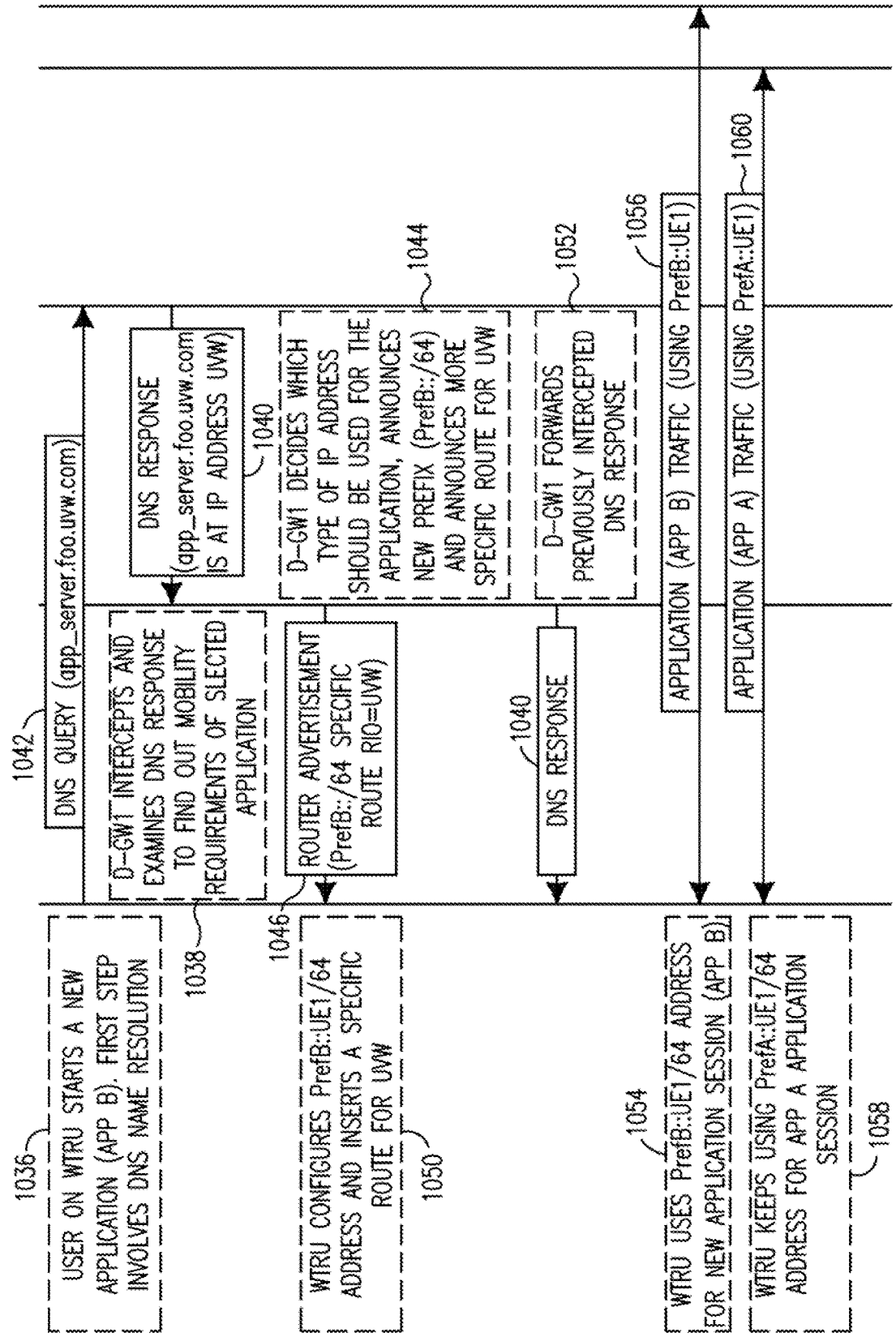

FIG. 10 is a message sequence chart illustrating an example of a more specific route based DNS-triggered IP address/anchor selection approach which is similar to the address deprecation approaches described with respect to FIGS. 8 and 9, but rather than the network deprecating addresses to force the WTRU to use a particular address, this goal is achieved instead by advertising more specific routes. FIG. 10 illustrates an example message sequence covering a case involving multiple applications.

In step 1004, WTRU 1000 may attach to a network via an access router (which is a distributed gateway designated as D-GW1 1002 in this example, although other types of access router may be used in various implementations). In step 1006, WTRU 1000 is initially assigned an IP address by D-GW1 1002 following a default policy (which might be specific per user or generic). In this example, the default policy is to assign a locally anchored, non-IP mobility enabled prefix (PrefLocal::/64), and this prefix is advertised to WTRU 1000 in message 1008. In step 1010, WTRU 1000 may configure an IP address (PrefLocal::UE1/64)) using the prefix received in message 1008.

In step 1012, a user of WTRU 1000 may start a new application (APP A), which triggers a session dialog using the configured prefix. The first packet sent may be a DNS query 1014 which is sent to DNS server 1016. In this example, the DNS query 1014 solicits the IP address of a server 1018 where app_server.foo.xyz.com is hosted. The response 1020 may be intercepted 1022 by D-GW1 1002, which may analyze either or both of the name and the resolved IP address or addresses against a database to attempt to identify the type of application that is being started on WTRU 1000, and its associated mobility capability requirements. It is noted that the access router may be co-located with a local DNS resolver (i.e., D-GW1 1002 may be co-located with DNS server 1016 for example) but in either case a DNS response may be intercepted. It is noted that in some implementations the DNS query itself may be intercepted and analyzed rather than the DNS query response.

This application-type and mobility-capability information, possibly together with other available information about the WTRU 1000 (e.g., mobility pattern, speed, and the like) may be used in a step 1024 to select the most appropriate type of IP address/anchor that may be used for this session. D-GW1 1002 may then transmit a message 1026 advertising a new prefix (PrefA::/64) and which may also include a more specific route, for example by using a Route Information Option (RIO). The WTRU 1000 may then in a step 1028 configure the new prefix and specific route for server 1018. D-GW1 1002 may also in a step 1030 forward the DNS response 1020. The WTRU 1000 may then in step 1032 use the IP address/anchor selected by the network to send and receive information 1034 between WTRU 1000 and server 1018 in the application session for APP A.

If in step 1036 the WTRU 1000 starts a new application (APP B), the same process may be repeated. In this case, D-GW1 1002 may in a step 1038 intercept a response 1040 to a DNS query 1042 (for app_server.foo.uvw.com) which is sent to DNS server 1016. In a step 1044, D-GW1 1002 may then analyze the response 1040 from DNS server 1016, and select an appropriate type of IP address to be used by the WTRU 1000 for APP B.

D-GW1 may then send a message 1046 to WTRU 1000 advertising a prefix of this type (in this example, PrefB::/64) which may also include a more specific route (e.g. using RIO) for the IP address of a server 1048 where app_server.foo.uvw.com is hosted. The WTRU 1000 may then in step 1050 configure the new prefix and specific route for server 1048. D-GW1 1002 may also in a step 1052 forward the DNS response 1040. The WTRU 1000 may then in step 1054 use the IP address configured from the new prefix for the APP B communication flow 1056.

It is noted that WTRU 1000 may continue using the IP address configured for APP A during the lifetime of the application APP A session 1058, 1060. It is also noted that in some implementations the use of the distributed logical interface (DLIF) concept may be required. This is because the present default address selection mechanism specifies that a node should prefer addresses in a prefix advertised by the next-hop. Therefore, in this case if more specific routes are used, the route announced (i.e., the next-hop that would be stored on the routing table of the WTRU) should be different for each announced prefix. It is also noted that both the address deprecation and more specific route approaches may also be used together.

Figure 11A:
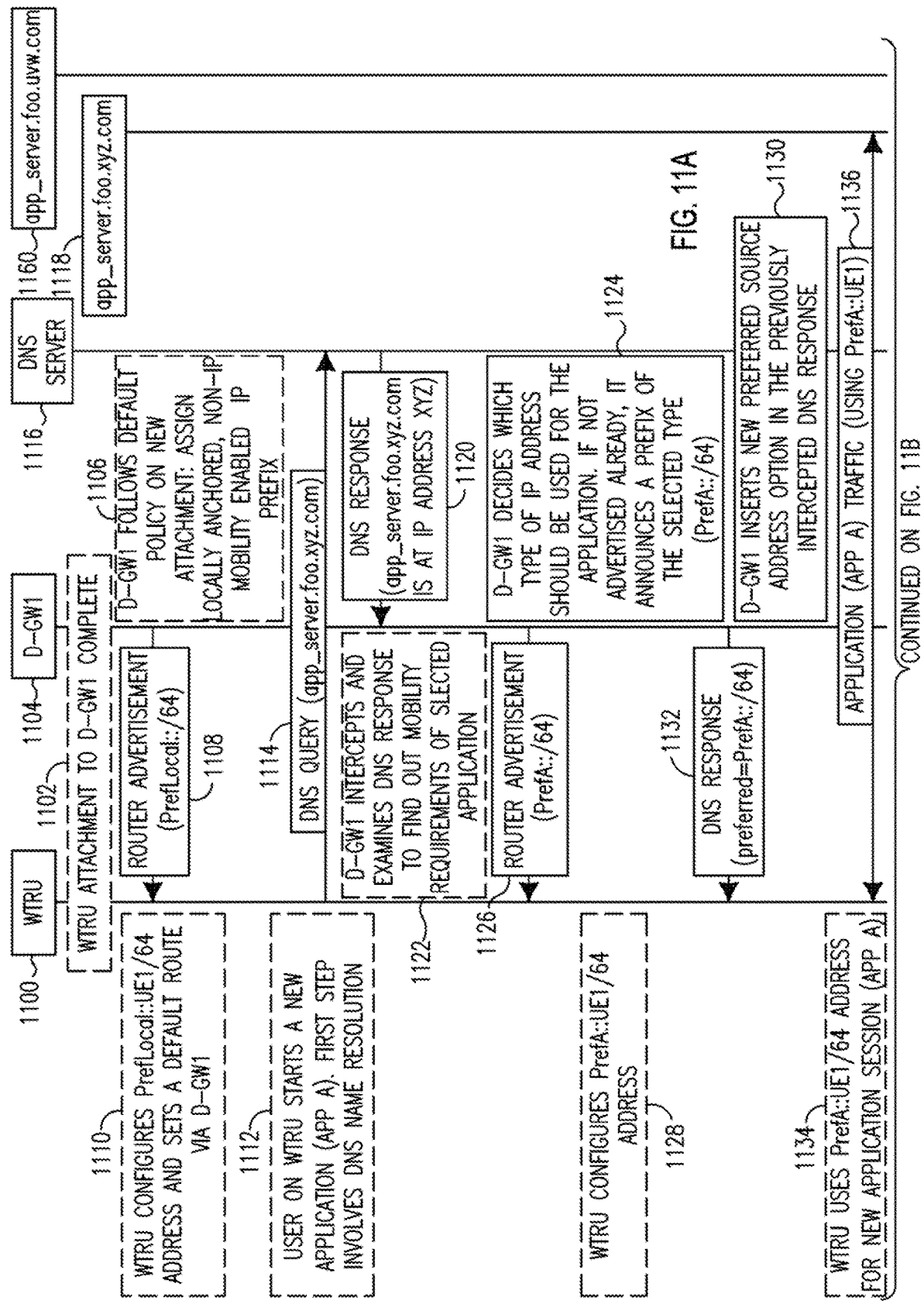
FIG. 11 is a message sequence chart which illustrates an example of DNS controlled IP address/anchor selection with multiple applications.
Figure 11B:
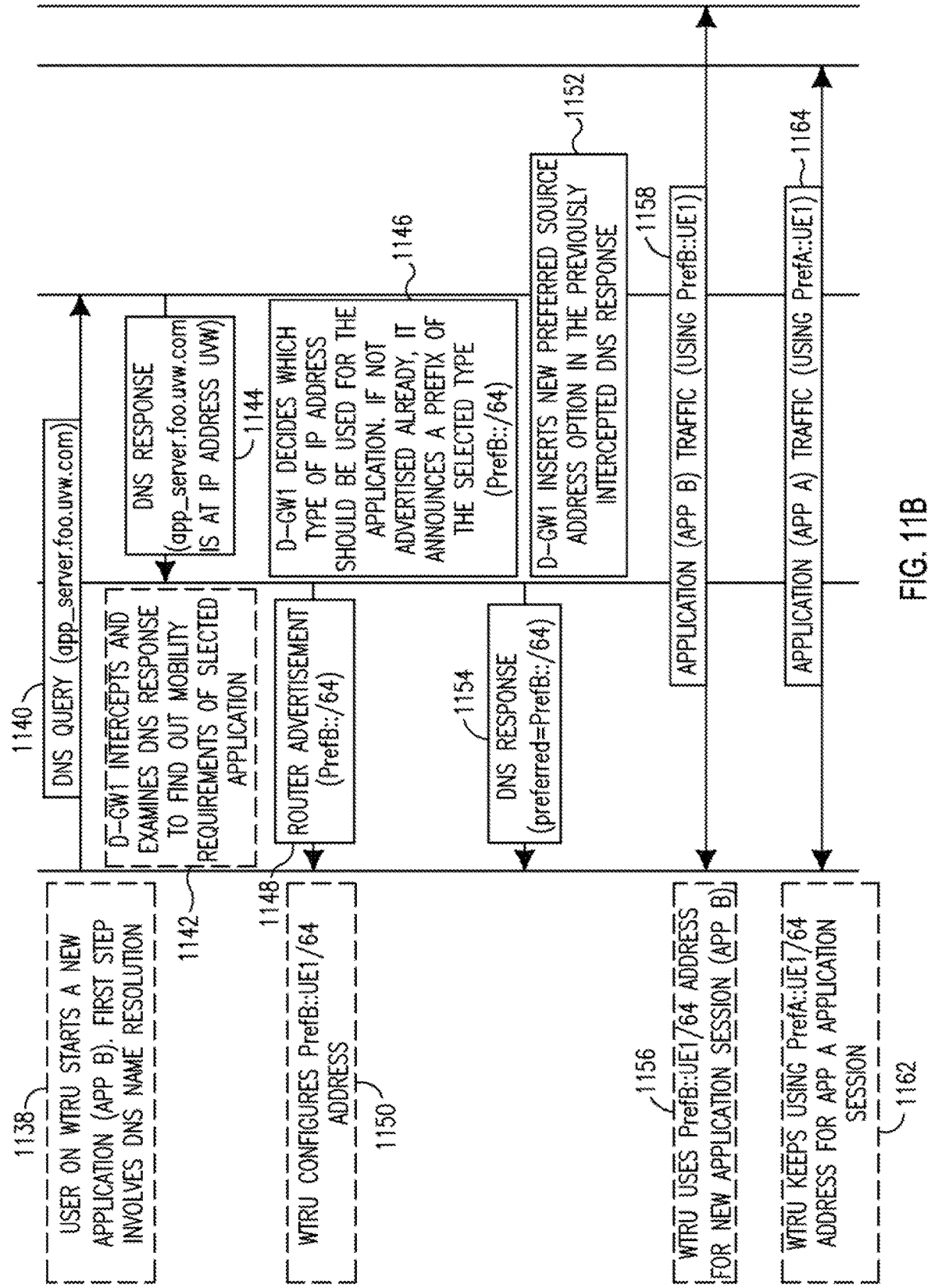

FIG. 11 is a message sequence chart illustrating an example of a DNS-triggered and controlled approach for the network to detect a new application flow and provide the WTRU with an IP address of a particular type. In this case, the network conveys a preference for a particular IP address in a modified DNS response. A new type of DNS register may be required for this approach.

In a step 1102, WTRU 1100 attaches to the network via an access router (which is a distributed gateway designated as D-GW1 1004 in this example, although other types of access router may be used in various implementations). In a step 1106, WTRU 1100 is initially assigned an IP address following a default policy (which might be specific per user or generic). In this example, the default policy is to assign a locally anchored, non-IP mobility enabled prefix (PrefLocal::/64), and this prefix is advertised to WTRU 1100 in message 1108. In step 1110, the WTRU 1100 may configure an IP address (PrefLocal::UE1/64)) using the prefix received in message 1108.

In step 1112, a user of WTRU 1100 starts a new application (APP A) which triggers a session dialogue using the configured prefix. The first packet sent may be a DNS query 1114 which is sent to DNS server 1116. In this example, the DNS query 1114 solicits the IP address of a server 1118 where app_server.foo.xyz.com is hosted. The response 1120 to query 1114 may be intercepted 1122 by D-GW1 1104, which may analyze either or both of the name and the resolved IP address or addresses against a database to attempt to identify the type of application that the user is starting, and the associated mobility capability requirements.

It is noted that the access router may be co-located with a local DNS resolver (i.e., D-GW1 1104 may be co-located with DNS server 1116 for example) but in either case a DNS response may be intercepted.

This application-type and mobility-capability information, possibly together with other available information about the WTRU (e.g., mobility pattern, speed, and the like)

may be used in a step 1124 to select the most appropriate type of IP address/anchor that should be used for this session.

If D-GW1 1104 has not already advertised an address of the selected type, D-GW1 1104 may then transmit a message 1126 advertising a new prefix (PrefA::/64) of the selected type. In a step 1128 WTRU 1100 may configure an IP address based on this prefix.

In step 1130, D-GW1 1104 may also modify the DNS response 1120 which was previously intercepted. The modification may include adding a preferred source address register to the DNS response. The modified DNS response 1132 may then be forwarded to the WTRU 1100. The WTRU may then in step 1134 use the selected IP address/anchor to send and receive information 1136 between WTRU 1100 and server 1118 in the application session for APP A.

If in step 1138 the WTRU 1100 starts a new application (APP B), the same process may be repeated. D-GW1 1104 may intercept 1142 a response 1144 to a DNS query 1140 (for app_server.foo.uvw.com) sent by WTRU 1100 to DNS server 1116. In step 1146, D-GW1 1104 analyzes the DNS response 1144, which may include analyzing either or both of the name and the resolved IP address or addresses against a database to attempt to identify the type of application that the user is starting, and the associated mobility capability requirements.

This application-type and mobility-capability information, possibly together with other available information about WTRU 1100 (e.g., mobility pattern, speed, and the like) may be used to select the most appropriate type of IP address to be used by WTRU 1100 for APP B.

If D-GW1 1104 has not already advertised an address of the selected type, D-GW1 1104 may then transmit a message 1148 advertising a new prefix (PrefB::/64), of the selected type. In step 1150, WTRU 1100 may configure an IP address based on the prefix.

In step 1152 D-GW1 1104 may also modify the DNS response 1144 which was previously intercepted, which may include adding a preferred source address register to the DNS response. The modified DNS response 1154 may then be forwarded to the WTRU 1100. WTRU1 may then in step 1156 use the selected IP address to send and receive information 1158 between WTRU 1100 and server 1160 in the application session for APP B.

It is noted that WTRU 1100 may continue using the IP address configured for APP A during the lifetime of the application APP A session 1162, 1164. It is also noted that the approach described with respect to FIG. 11 may require changes to the WTRU 1100, to enable it to receive and process a new type of DNS register and configure IP forwarding based on the content of the DNS response.

Figure 12:
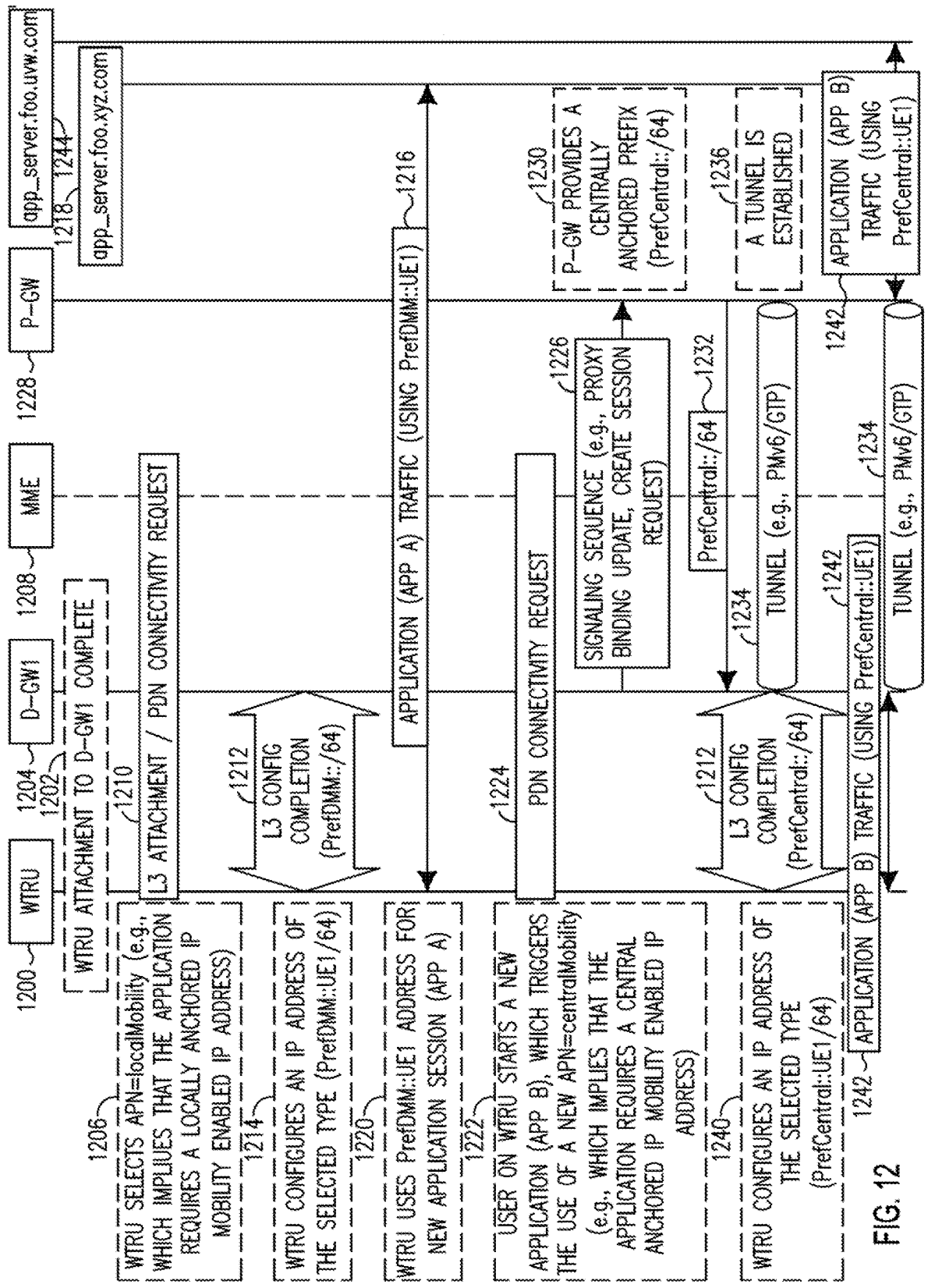
FIG. 12 is a message sequence chart which illustrates an example of APN-based anchor selection.

FIG. 12 is a message sequence chart illustrating an example of an Access Point Name (APN)-based anchor selection mechanism. In this approach, the network may decide the type of anchor and IP address based on an APN provided by the WTRU.

In step 1202, WTRU 1200 may attach to a network via an access router (which is a distributed gateway designated as D-GW1 1204 in this example, although other types of access router may be used in various implementations). In step 1206, WTRU 1200 may start an application (APP A) which requires the use of a particular APN (in this example APN=localMobility). This APN implies that a locally anchored IP mobility enabled address should be provided to the WTRU 1200.

The network (i.e. D-GW1 1204 or another part of the network) may be informed that this APN has certain requirements through several different means. For example, the APN requirements may be explicit (e.g. the WTRU 1200 knows the requirements of the application and explicitly requests an APN that provides that type of address) or may be inferred by the network (e.g., the APN implies a service from which the address & anchor mobility capability requirements can be derived).

WTRU 1200 may interact with a multimedia management entity (MME) 1208 to complete L3 attachment and a packet data network (PDN) connectivity request 1210, and receive a prefix advertisement 1212 (PrefDMM::UE1/64)) from D-GW1 1204. In a step 1214 the WTRU 1200 may then configure the provided address (PrefDMM::UE1/64)). WTRU 1200 may use this address for the new application session APP A 1220, to transmit and receive communications 1216 with server 1218 (app_server.foo.xyz.com, which hosts the running application for APP A).

If the user later starts 1222 another application (APP B) on WTRU 1200, the same process may be repeated. In this example, for APP B the selected APN=centralMobility, which implies that the WTRU 1200 is requesting a centrally anchored IP mobility enabled address (PrefCentral::UE1/64)).

WTRU 1200 may interact with MME 1208 to complete a PDN connectivity request in step 1224 relating to the request for a centrally anchored IP mobility enabled address. D-GW1 1204 then signals in step 1226 the requirement for a centrally anchored prefix to P-GW 1228. P-GW 1228 subsequently provides in step 1230 a centrally anchored prefix which it communicates in a message 1232 to D-GW1 1204. A tunnel 1234 is then established in step 1236 between D-GW1 1204 and P-GW 1228 (e.g., PMIPv6/GTP) in order to maintain the central anchoring at P-GW 1228 for the centrally anchored prefix. WTRU 1200 may then complete in step 1238 L3 configuration of the centrally anchored prefix with D-GW1 1204, and in step 1240 may configure an IP address using this prefix.

Thereafter, WTRU 1200 may use the centrally anchored IP mobility enabled IP address to transmit and receive communications 1242 with server 1244 (app_server.foo.uvw.com, which hosts the running application APP B) via tunnel 1234 and P-GW 1228.

An anchor "coloring" solution may also be employed to assist the WTRU to discover the IP connectivity capabilities of available anchors. Coloring in this sense may refer to information regarding the capabilities of a particular anchor. For example, a router may advertise its capability to provide both a local mobility enabled address and a centrally anchored mobility enabled address in a router advertisement message. A router might have very different capabilities in terms of IP address anchoring, including but not limited to: providing IP local connectivity, using locally anchored addresses (i.e., optimal routing path) with no mobility support; providing IP global connectivity using locally anchored addresses (i.e., optimal routing path) with no mobility support; providing IP global connectivity, using locally anchored addresses (i.e., optimal routing path, at least while connected to this router) with IP mobility support (i.e. DMM case) where additional information may be provided to indicate whether the node supports client or network-based DMM operation; or, providing IP global connectivity, using centrally anchored addresses with IP mobility support (i.e. PMIP/GTP case).

Figure 13A:
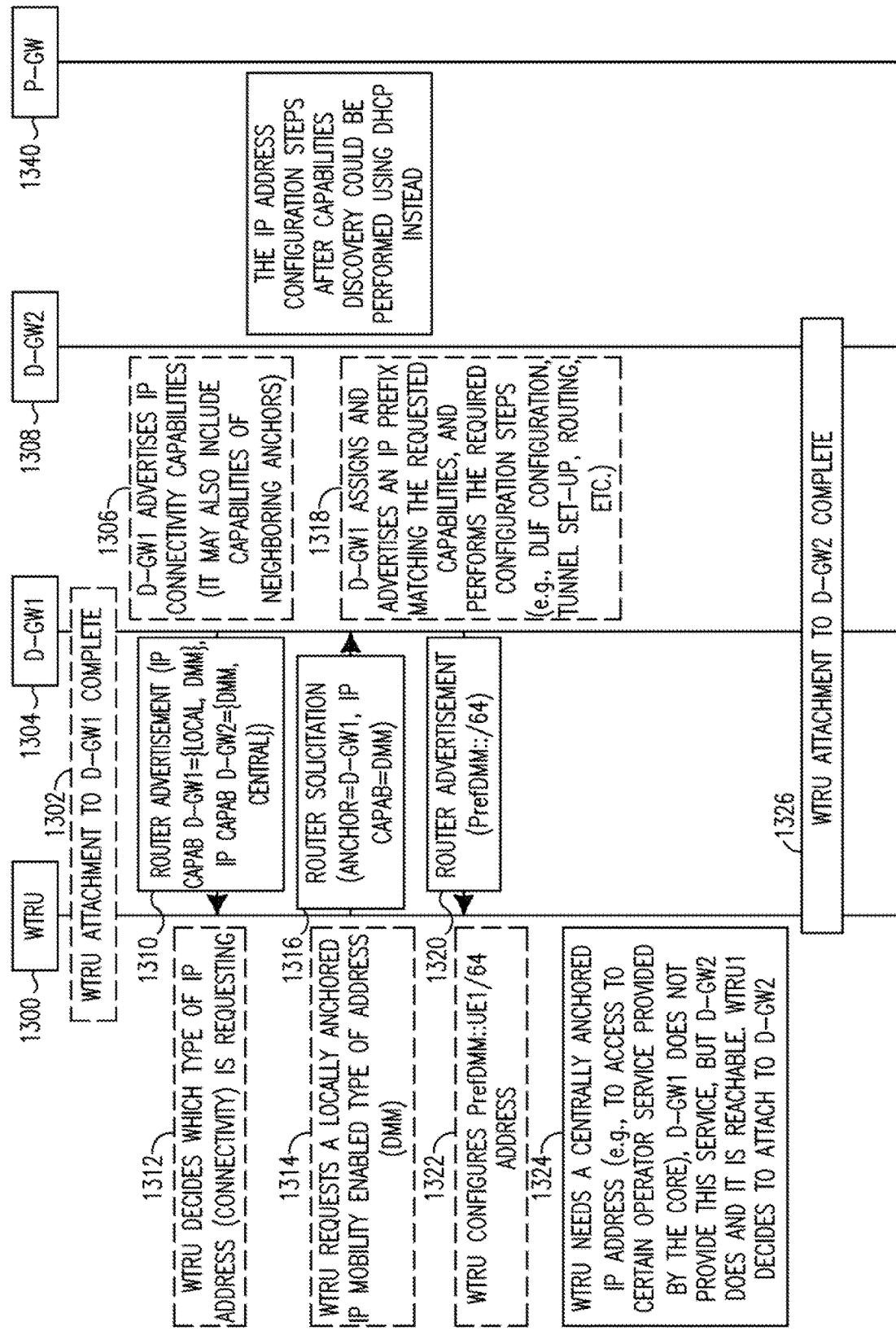
FIG. 13 is a message sequence chart which illustrates an example of a network-based mobility solution.
Figure 13B:
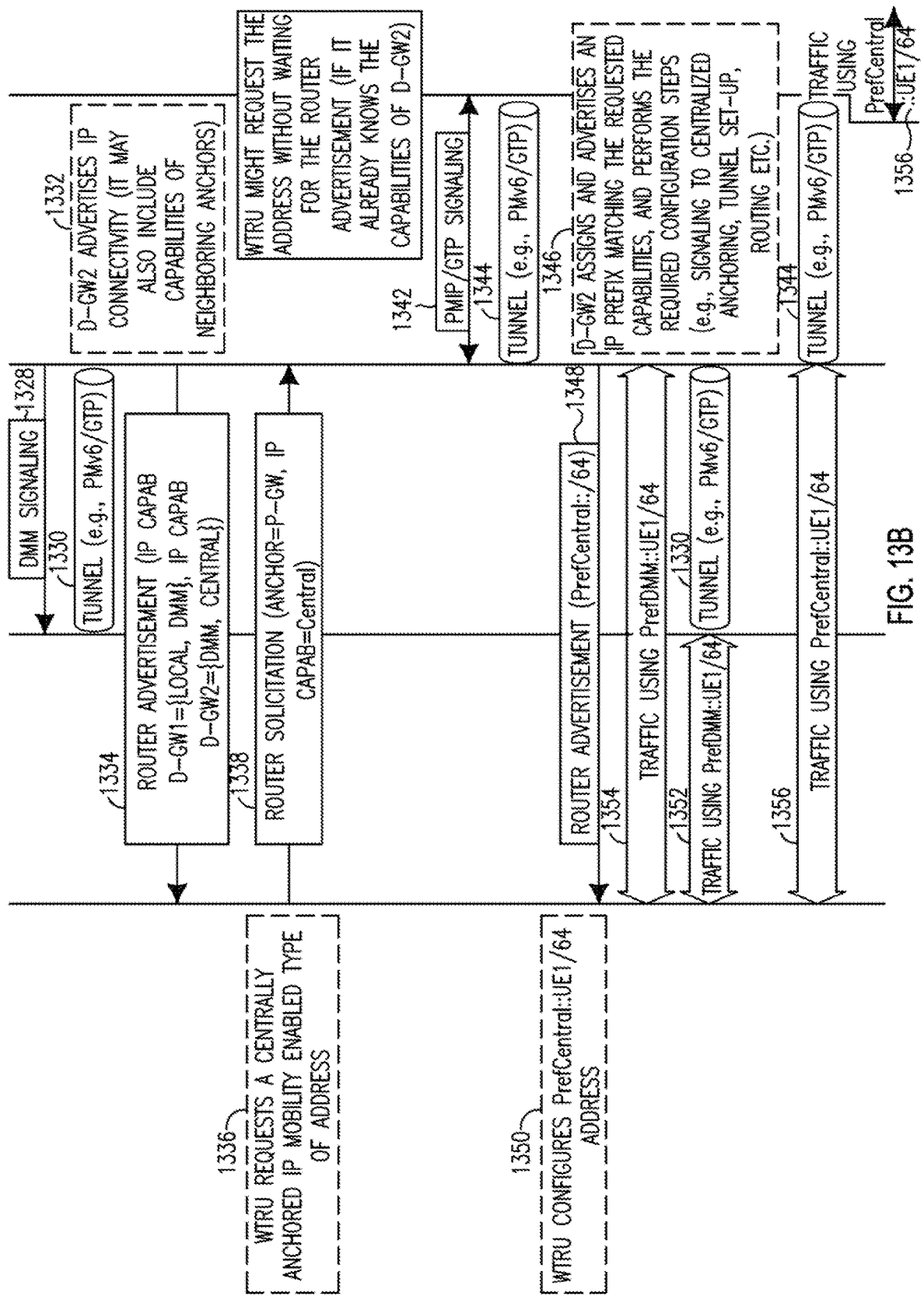

FIG. 13 is a message sequence chart illustrating operations for an example where a network-based mobility solution which includes anchor coloring is used.

In step 1302, the WTRU 1300 may attach to D-GW1 1304. D-GW1 1304 may advertise 1306 its IP capabilities and may also advertise the IP capabilities of neighboring anchors, in this case, of D-GW2 1308. Upon attachment to D-GW1 1304, WTRU 1300 may receive a router advertisement message 1310 which may convey the IP connectivity/addressing capabilities of D-GW1 1304 and D-GW2 1308. It is noted that the advertisement of capabilities could also or instead be done using L2 signaling.

In this case, D-GW1 1304 is a router capable of anchoring a local address with no IP mobility support, and a local address with IP mobility support. D-GW1 1304 also may signal the capabilities of a neighboring router, D-GW2 1308, which is capable of anchoring a local address with IP mobility support and also a centralized address with IP mobility support. Note that while D-GW1 1304 advertises neighbor capabilities in this example, other implementations are possible where D-GW1 1304 does not advertise neighbor capabilities. These capabilities may be conveyed in a new option within a router advertisement message which does not need to include any prefix information option.

Based on the its knowledge of application requirements and its own capabilities, the WTRU 1300 may in step 1312 select a type of address and in a step 1314 request it from D-GW1 1304. In the example shown in FIG. 13, this request may be made by sending a router solicitation message 1316 including a new option which specifies which type of address is requested. This option might include a list of types, ordered by preference, for example for cases in which the WTRU 1300 does not know in advance the capabilities of the router, or where the router runs out of addresses for the most preferred requested type. It is noted that in some implementations, a WTRU may transmit a request which specifies a type which type of address is requested without having received any communication regarding the IP mobility or anchoring capabilities of the gateway or gateways (e.g. in this example, WTRU 1300 may transmit message 1316 without first having received router advertisement message 1310.) In this example, the WTRU 1300 is requesting a locally anchored address with IP mobility support (i.e. DMM). In step 1318, D-GW1 1304 assigns PrefDMM::/64 to the WTRU 1300 and performs required configuration steps, and advertises this prefix to WTRU 1300 in a router advertisement 1320. After receiving advertisement 1320, WTRU 1300 may configure an IP address using this prefix in step 1322. It is noted that the IP address configuration steps after discovering the capabilities of D-GW1 1304 and D-GW2 1308 could also be performed using the Dynamic Host Configuration protocol (DHCP) or a technology specific protocol.

If the WTRU 1300 subsequently attaches to a different router because of mobility reasons, or simply because it needs a different kind of address which cannot be provided by the router it is attached to, but there is another anchor reachable that can, then the same signaling procedures may be performed. For example, in step 1324 the WTRU 1300 needs to access a service provided by the mobile operator's core and in order to do that it may require a centrally anchored address. Since WTRU 1300 has been informed that D-GW2 1308 can provide an address with this capability and that it is reachable, the WTRU 1300 may decide to attach to D-GW2 1308.

After the attachment 1326 of WTRU 1300 to D-GW2 1308 is complete, D-GW2 1308 may provide for continued accessibility of the previously assigned address PrefDMM:: UE1/64) that was configured in step 1322 by performing DMM procedures, including signaling 1328 and establishing a tunnel 1330 between D-GW1 1304 and D-GW2 1308.

D-GW2 1308 may advertise 1332 its IP capabilities and may also advertise the IP capabilities of neighboring anchors, in this case, of D-GW1 1304. WTRU 1300 may receive a router advertisement message 1334 from D-GW2 1308 which may convey the IP connectivity/addressing capabilities of D-GW2 1308 and D-GW1 1304. In this case, D-GW2 1308 is a router capable of anchoring a centralized address with mobility support, and in a step 1336 WTRU 1300 transmits an appropriate router solicitation message 1338 to D-GW2 1308 requesting a centrally anchored mobility enabled IP address. It is noted that WTRU 1300 may transmit the router solicitation 1338 without waiting for the router advertisement 1334 if it has already been apprised of the capabilities of D-GW2 1308, as for example in router advertisement 1310.

In response to router solicitation 1338, D-GW2 may provide for the accessibility of the central anchor at P-GW 1340 by performing appropriate signaling 1342 (in this example including PMIP/GTP signaling) and establishing a tunnel 1344 between D-GW2 1308 and P-GW 1340 in order to maintain the anchoring for a centrally anchored prefix. In step 1346, D-GW2 1308 also assigns an IP prefix matching the requested capabilities (i.e. centrally anchored, IP mobility enabled) and advertises the prefix to WTRU 1300 in a router advertisement 1348. WTRU 1300 may then in step 1350 configure an IP address using this prefix.

While WTRU 1300 is attached to D-GW2 1308, traffic using PrefDMM::UE1/64) (i.e. the locally anchored IP mobility enabled address) appears to be transmitted as traffic 1352 between WTRU 1300 and D-GW1 1304 (where this address is anchored). However, this traffic in fact travels as traffic 1354 between WTRU 1300 and D-GW2 1308, which forwards the traffic to D-GW1 1304 via tunnel 1330 (and vice-versa). Traffic using PrefCentral::UE1/64) travels as traffic 1356 to D-GW2 1308, the currently connected (serving) GW in this case, which forwards the traffic to the central anchor P-GW 1340 via tunnel 1344.

Figure 14A:
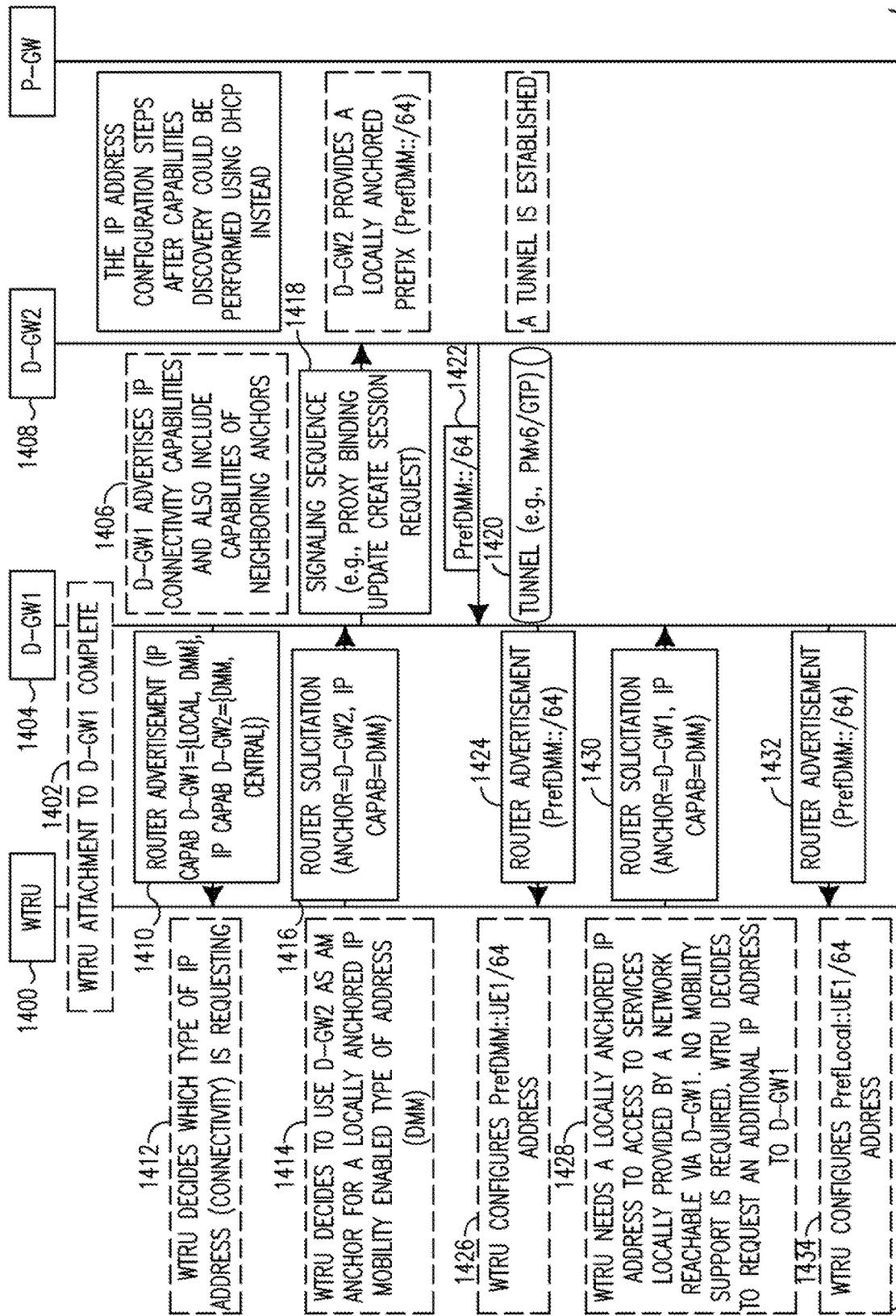
FIG. 14 is a message sequence chart which illustrates an example in which the WTRU selects as anchor a node to which it is directly attached.
Figure 14B:
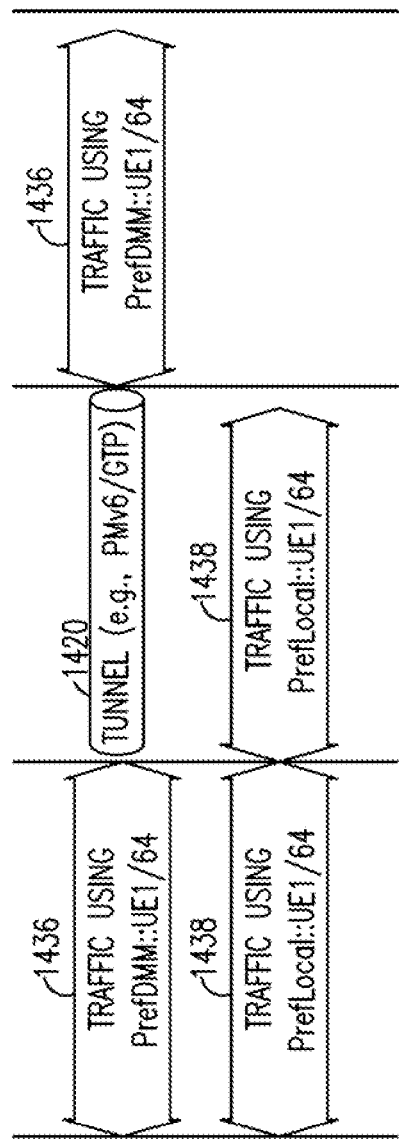

The example depicted in FIG. 13 illustrates a case in which the WTRU 1300 selects as anchor a node to which it is directly attached (i.e. WTRU 1300 changed its point of attachment to obtain an IP address of a type which was not available at its original point of attachment). However it is also possible to select a node other than the router to which WTRU is directly attached as an anchor. FIG. 14 illustrates an example of this case.

In step 1402, WTRU 1400 attaches to D-GW1 1404. D-GW1 1404 may advertise 1406 its IP capabilities and may also advertise the IP capabilities of neighboring anchors, in this case, of D-GW2 1408. Upon attachment to D-GW1 1404, WTRU 1400 may receive a router advertisement message 1410 which may convey the IP connectivity/addressing capabilities of D-GW1 1404 and D-GW2 1408. It is noted that the advertisement of capabilities could also, or instead, be done using L2 signaling.

Here, D-GW1 1404 is a router capable of anchoring a local address with no IP mobility support, and a local address with IP mobility support. D-GW1 1404 also may signal the capabilities of a neighboring router, D-GW2 1408, which is capable of anchoring a local address with IP mobility support and also a centralized address with IP mobility support.

Based on its knowledge of application requirements and its own capabilities, the WTRU 1400 may in step 1412 decide that it requires a locally anchored IP-mobility enabled address. In a step 1414, WTRU 1400 may decide to use D-GW2 1408 as an anchor for the locally anchored IP-mobility enabled address, based at least in part on the information it received in router advertisement 1410. WTRU 1400 may request a locally anchored IP-mobility enabled address that is anchored at D-GW2 1408 by sending a router solicitation message 1416 to D-GW1 1404, where this message includes information regarding the selection of D-GW2 1408 as the anchor, in addition to specifying the required mobility requirements.

Upon receiving message 1416, D-GW1 1400 may perform signaling 1418 to obtain an IP prefix 1422 of the requested type (PrefDMM::/64 in this case) from D-GW2 and to establish a tunnel 1420 and state needed to enable the accessibility of that address by WTRU 1400 from D-GW2 1408 via D-GW1 1404. D-GW1 may then advertise the obtained prefix (PrefDMM::/64) in a router advertisement 1424, and the WTRU 1400 may configure and use an address from the prefix (PrefDMM::UE1/64)) in step 1426.

If in step 1428 the WTRU 1400 later requires a locally anchored (i.e. anchored at D-GW1 1404) address, for example to access to services locally available at a network directly connected to D-GW1 1404, WTRU 1400 may request this type of address by sending a new router solicitation message 1430. D-GW1 may then assign a locally anchored prefix (PrefLocal::/64) to the WTRU 1400 in a router advertisement 1432. WTRU 1400 may then in step 1434 configure an IP address using the prefix (PrefLocal:: UE1/64)) and begin to use it for communications. Thereafter, traffic 1438 on PrefLocal::UE1/64) may remain anchored at D-GW1 1404, and traffic 1436 on PrefDMM:: UE1/64) may remain anchored at D-GW2 1408 and be forwarded to D-GW2 1408 from D-GW1 1404 via tunnel 1420.

If a client-based mobility solution is in place, a WTRU may use the anchor coloring information to also decide which node should manage the mobility of a certain flow, i.e., either the network or the terminal itself. For example, if the WTRU is attached to a node that is able to play the role of anchor of an IP mobility enabled address, the network may be capable of providing mobility support to that IP address. However, a client-mobility capable WTRU could also decide to use a non-IP mobility enabled address (thus obviating the signaling and network state associated with providing network-based mobility support) and manage its mobility using another node as an anchor (e.g., a home agent at the home network of the WTRU, or locally available node discovered by the WTRU, which is capable of anchoring a session). It should be noted that it is likely that a client-mobility enabled WTRU could attach to a network capable of providing network-based mobility support, and in this case, it would be beneficial if the WTRU could decide which entity manages its mobility (on an address basis).

Figure 15:
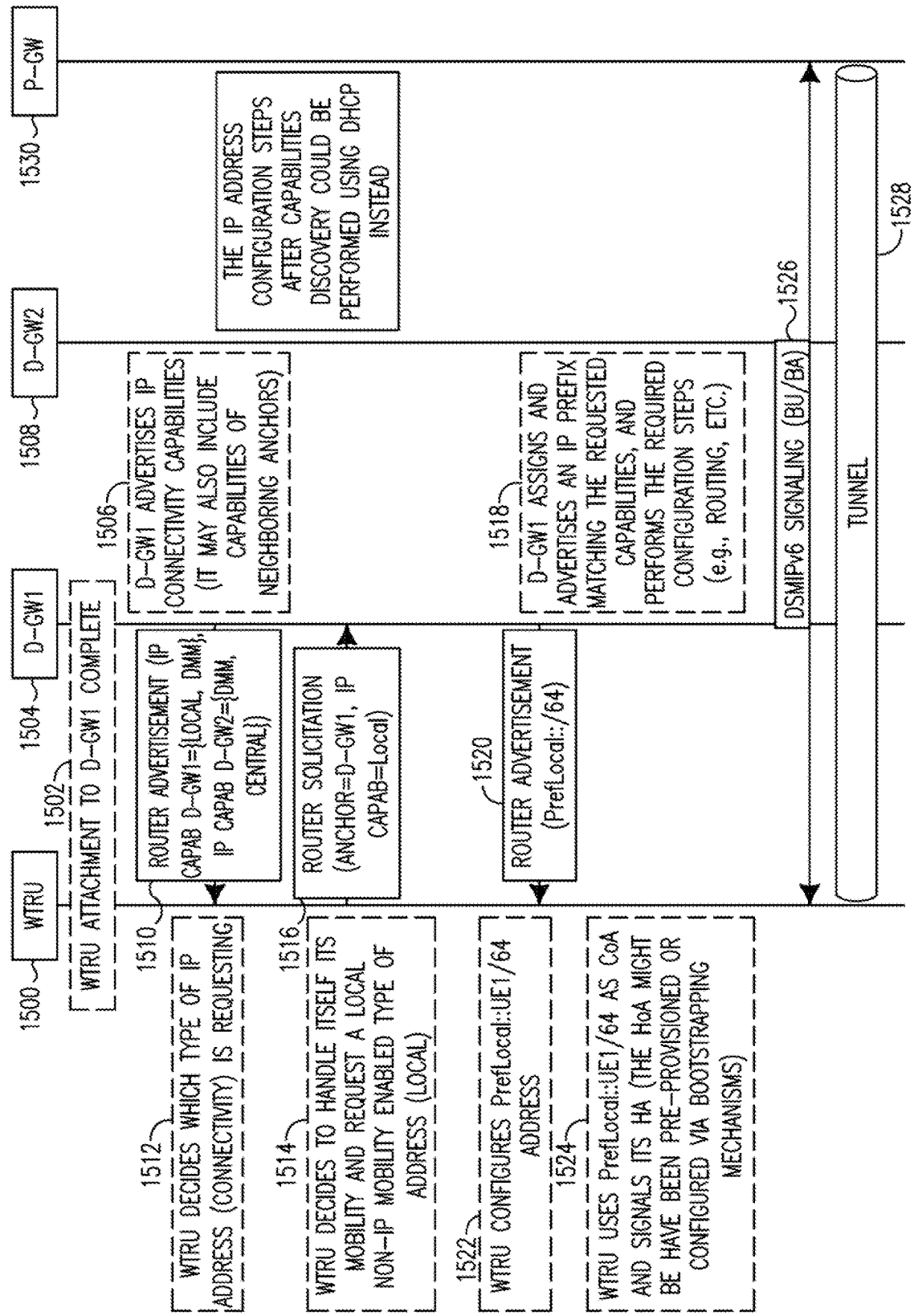
FIG. 15 is a message sequence chart which illustrates an example in which a WTRU selects to manage its own mobility.

FIG. 15 is a message sequence chart illustrating an example in which a client-mobility capable WTRU elects to manage its own mobility, by requesting a locally anchored, non-IP mobility enabled address to D-GW1 and using it as a care-of address (CoA) with a home agent (HA).

In step 1502, the WTRU 1500 may attach to D-GW1 1504. D-GW1 1504 may advertise 1506 its IP capabilities and may also advertise the IP capabilities of neighboring anchors, in this case, of D-GW2 1508. Upon attachment to D-GW1 1504, WTRU 1500 may receive a router advertisement message 1510 which may convey the IP connectivity/ addressing capabilities of D-GW1 1504 and D-GW2 1508.

In this case, D-GW1 1504 is a router capable of anchoring a local address with no IP mobility support, and a local address with IP mobility support. D-GW1 1504 also may signal the capabilities of a neighboring router, D-GW2 1508, which is capable of anchoring a local address with IP mobility support, and a centrally anchored address with IP mobility support. Note that while D-GW1 1304 advertises neighbor capabilities in this example, other implementations are possible where D-GW1 1504 does not advertise neighbor capabilities.

In step 1512, WTRU 1500 may decide which type of IP address it requires. In this example WTRU 1500 is client-mobility capable, and in step 1514, WTRU 1500 decides to manage its mobility requirements on its own. To this effect, WTRU 1500 transmits a router solicitation message 1516 to D-GW1 1504 requesting a locally anchored, non-IP mobility enabled IP prefix.

In step 1518, D-GW1 1504 then assigns an IP prefix matching the requested capabilities and performs the appropriate configuration steps which may include signaling and routing. D-GW1 1504 then transmits a router advertisement message 1520 to WTRU 1500, which may configure an IP address (PrefLocal::UE1/64)) using this prefix in step 1522.

In step 1524, WTRU 1500 establishes the IP address (PrefLocal::UE1/64)) as its CoA with a HA (in this example, the HA is a P-GW 1530), which may include appropriate signaling 1526 (e.g. DSMIPv6 signaling BU/BA) and establishing a tunnel 1528 with the HA. It is noted that the HA may have been pre-provisioned by or configured via bootstrapping mechanisms. Pre-provisioning may be done for example by assigning in advance an IP address to the WTRU 1500, for example, by hardcoding, configuration using dynamic or static policies and the like, or by storing the IP address locally (e.g. on a SIM car). Bootstrapping in this case may be done for example by using the DSMIP tunnel establishment to obtain an HoA from P-GW or by requesting an HoA from P-GW (e.g. by sending a DHCP request to P-GW.

Figure 16:
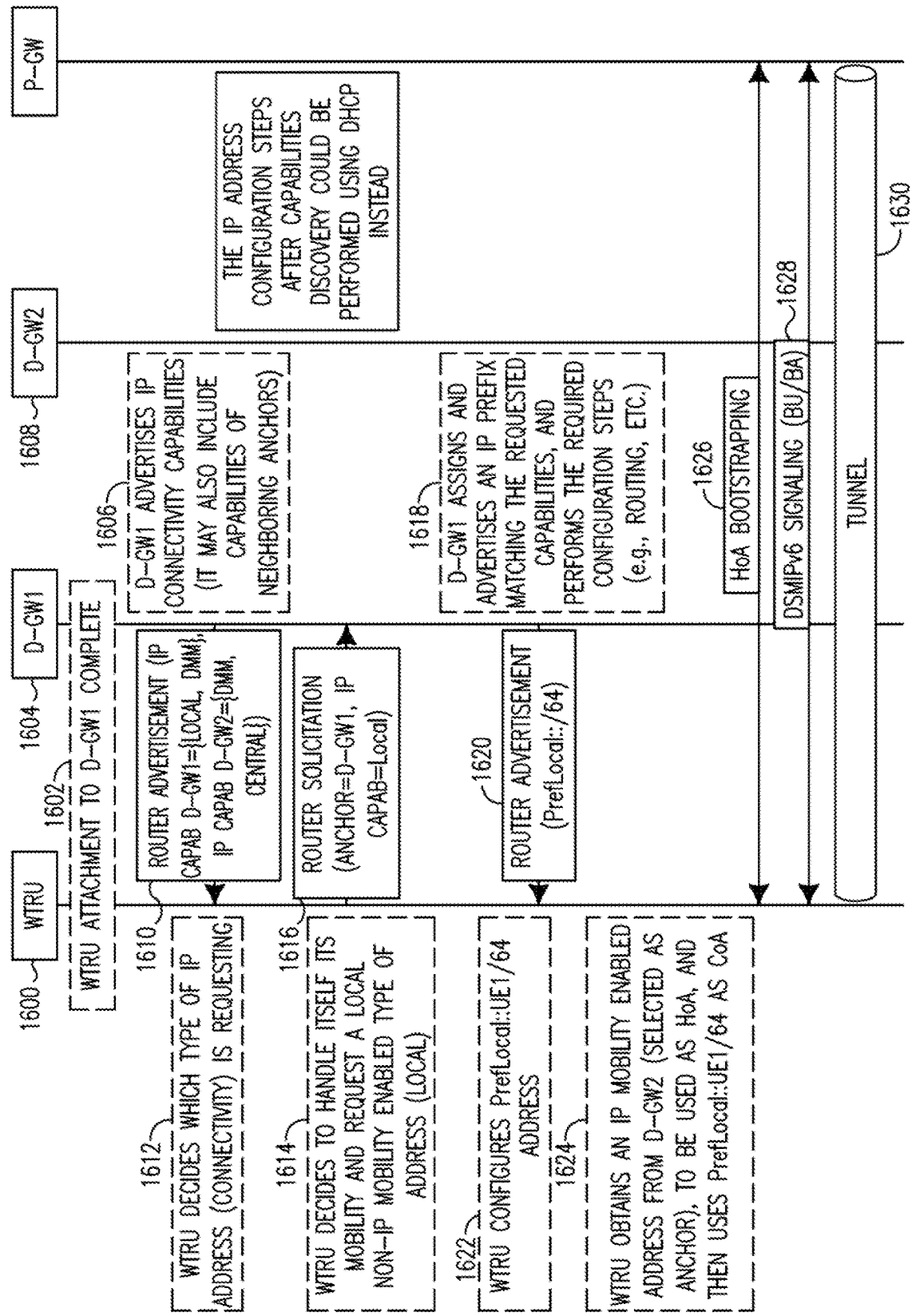
FIG. 16 is a message sequence chart which illustrates an example in which the anchor to be used by the WTRU is one of the neighboring nodes.

FIG. 16 is a message sequence chart illustrating an example in which the anchor to be used by the client-mobility capable WTRU is a neighboring node (rather than a centralized P-GW as in the example of FIG. 15).

In step 1602, the WTRU 1600 may attach to D-GW1 1604. D-GW1 1604 may advertise 1606 its IP capabilities and may also advertise the IP capabilities of neighboring anchors, in this case, of D-GW2 1608. Upon attachment to D-GW1 1604, WTRU 1600 may receive a router advertisement message 1610 which may convey the IP connectivity/ addressing capabilities of D-GW1 1604 and D-GW2 1608.

In this case, D-GW1 1604 is a router capable of anchoring a local address with no IP mobility support and a local address with IP mobility support. D-GW1 1604 also may signal the capabilities of a neighboring router, D-GW2 1608, which is capable of anchoring a local address with IP mobility support and a centrally anchored address with IP mobility support. In this way, WTRU 1600 may learn that a node other than the one to which it is attached (i.e. D-GW2 1608 in this example) can be used as an anchor for a client-based mobility approach.

In step 1612, WTRU 1600 may decide which type of IP address it requires. In this example WTRU 1600 is client-mobility capable, and in step 1614, WTRU 1600 decides to manage its mobility requirements on its own. To this effect, WTRU 1600 may transmit a router solicitation message 1616 to D-GW1 1604 requesting a locally anchored, non-IP mobility enabled IP prefix (to be used in establishing an IP address for use as a CoA).

In step 1618, D-GW1 1604 then assigns an IP prefix matching the requested capabilities and performs the appropriate configuration steps which may include signaling and routing. D-GW1 1604 then transmits a router advertisement message 1620 to WTRU 1600, which may configure an IP address (PrefLocal::UE1/64)) using this prefix in step 1622.

In step 1624, WTRU 1600 obtains an IP mobility enabled address anchored at D-GW2 1608 to be used as a HA. WTRU 1600 may obtain the address anchored at D-GW2 1608 by bootstrapping 1626 or otherwise, and may proceed with appropriate signaling 1628 for binding to D-GW2 and establishing a tunnel between WTRU 1600 and D-GW2 1608. In some implementations, WTRU 1600 may instead obtain the address anchored at D-GW2 during establishment of the tunnel 1630. WTRU 1600 may then use PrefLocal:: UE1/64), previously configured in step 1622, as a CoA.

Figure 17:
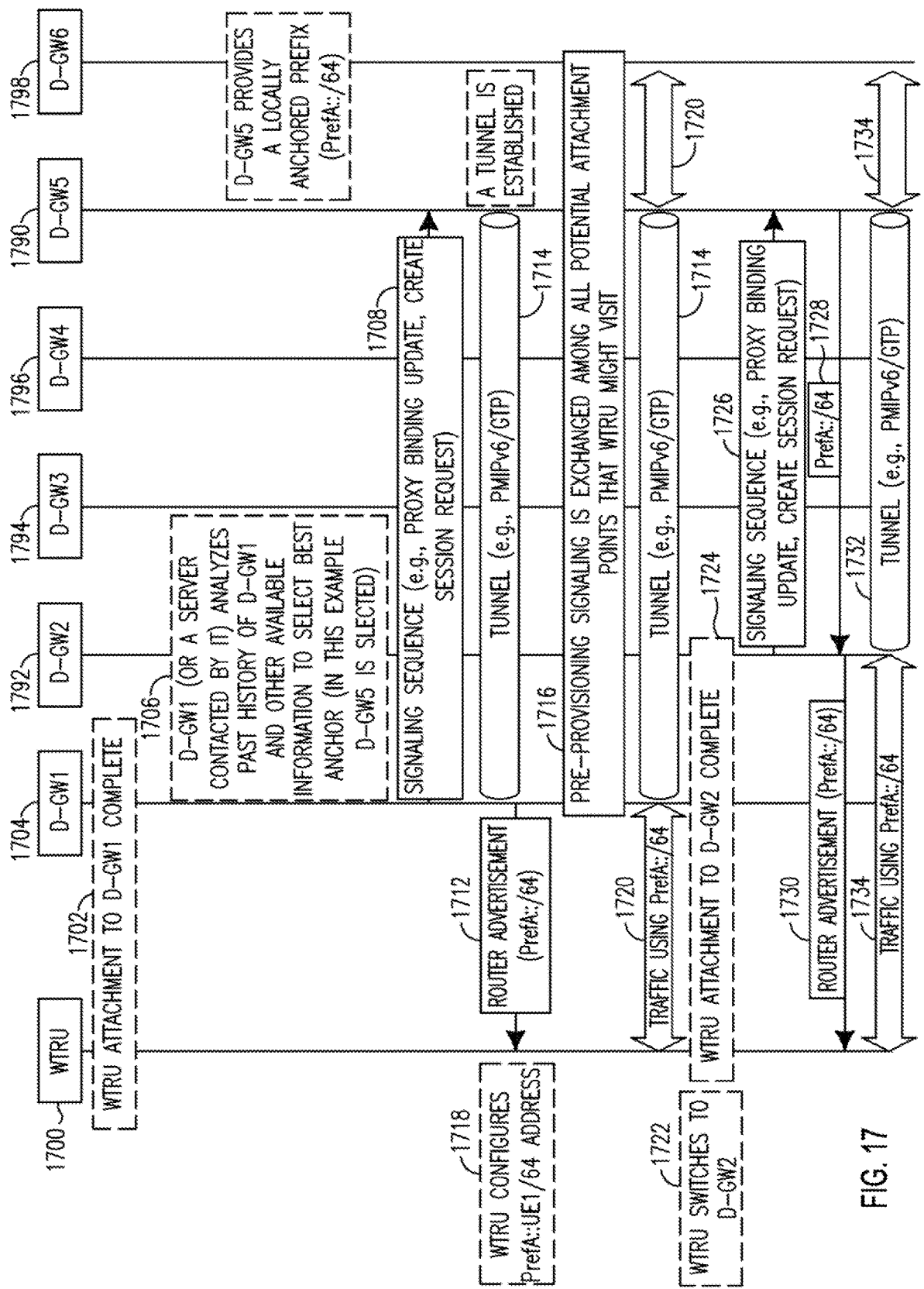
FIG. 17 is a message sequence chart which illustrates an example of signaling for a WTRU in a dense environment.

FIG. 17 is a message sequence chart illustrating example signaling for network-controlled anchor selection in a dense environment. This example assumes a very dense environment and a mobile WTRU 1700 which may attach to many different access routers (D-GWs in this example). In this case, it may be beneficial for the WTRU 1700 not to configure a different local IP address for each visited D-GW, but rather for only some access routers to anchor sessions. Note that this approach may be used in combination with the previous solutions for deciding which kind of IP address should be provided.

In step 1702, WTRU 1700 attaches to the network at an access router, which in this example is a distributed gateway designated as D-GW1 1704. In step 1706, D-GW1 1704 may conduct an analysis of whether it should provide a locally anchored IP address to WTRU 1700, or if another access router should provide an anchor. This analysis may be based, for example, on an expected mobility pattern of WTRU 1700 and/or application requirements, and may include contacting a different network entity which may have the required information and/or intelligence for this purpose (not shown). The result of this analysis may determine that another router, for example D-GW5 1790, should be selected as anchor.

In this case, D-GW1 1704 may exchange the required signaling 1708 with D-GW5 1790 to obtain a prefix 1710 (PrefA::/64), and may announce the prefix 1710 in a router advertisement 1712 to WTRU 1700. A tunnel 1714 may also be established between D-GW1 1704 and D-GW5 1790. Because the WTRU 1700 is expected to move in this example, pre-provision signaling 1716 may also be exchanged with other routers, D-GW2 1792, D-GW3 1794 D-GW4 1796 and D-GW6 1798, which may potentially be visited by WTRU 1700, to prepare these routers for possible attachment. In a step 1718 WTRU 1700 may configure an IP address PrefA::UE1/64) based on the prefix received in router advertisement 1712, and may use it for its communications. Traffic 1720 on PrefA::UE1/64) may be encapsulated between D-GW1 1704 and D-GW5 1790 via tunnel 1714.

If the WTRU 1700 changes its point of attachment from D-GW1 1704, the tunnel 1714 may need to be updated. For example, in step 1722 WTRU 1700 may decide to switch its point of attachment to D-GW2 1792. In step 1724, attachment to D-GW2 1792 is complete, and D-GW2 exchanges appropriate signaling 1726 with D-GW5 to obtain a prefix 1728 (PrefA::/64) already allocated to WTRU 1700, and may announce the prefix 1728 in a router advertisement 1730 to WTRU 1700. A tunnel 1732 may also be established between D-GW2 1792 and D-GW5 1790 to provide for traffic 1734 to be forwarded, thus replacing the tunnel 1714 between D-GW1 1704 and D-GW5 1790. It is noted that in this example, the required network state was pre-provisioned (not shown).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A method for use in a wireless transmit/receive unit (WTRU), the method comprising:
   establishing a session with a network access device;
   determining an internet protocol (IP) mobility capability requirement, from at least three possible IP mobility capability requirements, of an application on the WTRU;
   transmitting a request, for an IP address based on the determined IP mobility capability requirement of the application, when establishing the session; and
   receiving an IP address selected from a plurality of available IP addresses based on the IP mobility capability requirement,
   wherein the IP mobility capability requirement is selected from at least three IP mobility capabilities of the network access device.

2. The method of claim 1, wherein the IP mobility capability requirement indicates a desired capability of the network access device or of a second network access device in communication with the network access device.

3. The method of claim 1, wherein the transmission of an IP mobility capability requirement comprises information regarding a capability of a second network access device in communication with the network access device.

4. The method of claim 1, wherein the transmission of an IP mobility capability requirement comprises a dynamic host configuration protocol (DHCP) communication.

5. The method of claim 1, wherein the WTRU transmits a router solicitation, which includes the IP mobility capability requirement, to the network access device.

6. The method of claim 1, wherein the WTRU transmits a plurality of different IP mobility capability requirements, ranked by preference, to the network access device.

7. The method of claim 1, wherein the WTRU transmits the IP mobility capability requirement to the network access device prior to receiving any indication regarding an IP mobility capability of the network access device or a second network access device in communication with the network access device.

8. The method of claim 1, wherein the WTRU requests an IP address from the network access device, or from a second network access device in communication with the network access device, based on the IP mobility capability requirement.

9. A method for use in a wireless gateway, the method comprising:
   establishing a session with a wireless transmit/receive unit (WTRU);
   receiving, from the WTRU, an internet protocol (IP) mobility requirement, determined by the WTRU, from at least three possible IP mobility requirements of an application on the WTRU, when establishing the session; and
   transmitting, to the WTRU, an IP address selected based on the IP mobility requirement from a plurality of available IP addresses,
   wherein the IP mobility requirement corresponds to one of at least three IP mobility capabilities of the wireless gateway or one of at least three anchoring capabilities of the wireless gateway.

10. The method of claim 9, wherein the IP mobility capability requirement indicates a desired capability of the wireless gateway or of a second wireless gateway in communication with the wireless gateway.

11. The method of claim 9, wherein the IP mobility capability requirement includes information regarding a capability of a second wireless gateway in communication with the wireless gateway.

12. The method of claim 9, wherein the received IP mobility capability requirement comprises a dynamic host configuration protocol (DHCP) communication.

13. The method of claim 9, wherein the wireless gateway receives a router solicitation which includes the IP mobility capability requirement from the WTRU.

14. The method of claim 9, wherein the wireless gateway receives a plurality of different IP mobility capability requirements, ranked by preference, from the WTRU.

15. The method of claim 9, wherein the wireless gateway receives the IP mobility capability requirement from the WTRU prior to transmitting any indication regarding an IP mobility capability of the wireless gateway or a second wireless gateway in communication with the wireless gateway.

16. The method of claim 9, wherein the wireless gateway or a second wireless gateway in communication with the wireless gateway receives a request from the WTRU for an IP address based on the IP mobility capability requirement.

* * * * *